US011918928B2

(12) United States Patent
Nocon et al.

(10) Patent No.: US 11,918,928 B2
(45) Date of Patent: Mar. 5, 2024

(54) VIRTUAL PRESENTATION OF A PLAYSET

(71) Applicant: Disney Enterprises, Inc., Burbank, CA (US)

(72) Inventors: Nathan D. Nocon, Valencia, CA (US); Janice K. Rosenthal, Pasadena, CA (US); Michael P. Goslin, Sherman Oaks, CA (US); Hunter J. Gibson, Burbank, CA (US); Dawson M. Dill, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 661 days.

(21) Appl. No.: 16/717,479

(22) Filed: Dec. 17, 2019

(65) Prior Publication Data

US 2021/0178272 A1 Jun. 17, 2021

(51) Int. Cl.

| A63F 13/825 | (2014.01) |
| A63F 13/65 | (2014.01) |
| A63H 3/52 | (2022.01) |
| G06F 3/01 | (2006.01) |
| G06K 7/14 | (2006.01) |
| G06K 19/07 | (2006.01) |
| G06T 7/70 | (2017.01) |
| G06V 20/20 | (2022.01) |
| A63H 5/00 | (2006.01) |

(52) U.S. Cl.
CPC .............. *A63H 3/52* (2013.01); *A63F 13/65* (2014.09); *G06F 3/011* (2013.01); *G06K 7/1413* (2013.01); *G06K 19/0723* (2013.01); *G06T 7/70* (2017.01); *G06V 20/20* (2022.01); *A63F 2300/69* (2013.01); *A63H 5/00* (2013.01)

(58) Field of Classification Search
CPC .... A63F 13/65; A63F 13/825; A63F 2300/69; A63F 2300/8082; A63H 2200/00
See application file for complete search history.

(56) References Cited

U.S. PATENT DOCUMENTS

| 3,680,146 A | 7/1972 | Leitner et al. |
| 5,190,285 A * | 3/1993 | Levy .................... A63F 7/0664 463/43 |
| 5,746,602 A * | 5/1998 | Kikinis ................. A63H 30/04 446/298 |

(Continued)

FOREIGN PATENT DOCUMENTS

| EP | 3356771 B1 * | 11/2021 | ......... A63B 24/0062 |
| WO | WO-2015118545 A1 * | 8/2015 | ......... A63H 33/3055 |

OTHER PUBLICATIONS

"AR Dollhouse," published May 20, 2019. Source: https://www.plublimpiti.com/ar-dollhouse (Year: 2019).*

(Continued)

*Primary Examiner* — Steven J Hylinski
(74) *Attorney, Agent, or Firm* — Patterson + Sheridan, LLP

(57) ABSTRACT

A method for interacting with a playset comprises acquiring, using a sensor on a mobile device, data corresponding to the playset, and selecting a virtual presentation to display on the mobile device based on the data. The method further comprises displaying, on the display, the virtual presentation while the mobile device is mounted with the playset. The virtual presentation comprises virtual content corresponding to at least one of an interior of the playset and a first physical object.

20 Claims, 16 Drawing Sheets

(56) References Cited

U.S. PATENT DOCUMENTS

| | | | | |
|---|---|---|---|---|
| 5,853,327 | A * | 12/1998 | Gilboa | A63F 13/235 |
| | | | | 273/237 |
| 6,160,986 | A * | 12/2000 | Gabai | G09B 5/065 |
| | | | | 434/323 |
| 6,227,931 | B1 * | 5/2001 | Shackelford | G09B 5/02 |
| | | | | 446/268 |
| 6,464,503 | B1 * | 10/2002 | Heit | G09B 19/04 |
| | | | | 434/335 |
| 6,560,511 | B1 * | 5/2003 | Yokoo | G06N 3/006 |
| | | | | 700/223 |
| 6,773,325 | B1 * | 8/2004 | Mawle | A63F 13/23 |
| | | | | 446/298 |
| 7,037,166 | B2 * | 5/2006 | Shrock | A63H 3/00 |
| | | | | 446/268 |
| 7,244,183 | B1 * | 7/2007 | England | A63H 30/04 |
| | | | | 446/175 |
| 7,618,303 | B2 * | 11/2009 | Ganz | A63F 13/00 |
| | | | | 446/175 |
| 8,033,901 | B2 * | 10/2011 | Wood | A63F 13/245 |
| | | | | 446/175 |
| 8,371,895 | B1 * | 2/2013 | Lam | A63H 3/36 |
| | | | | 446/108 |
| 8,702,006 | B2 | 4/2014 | Laknin et al. | |
| 8,702,512 | B2 * | 4/2014 | Mineur | A63F 13/71 |
| | | | | 345/173 |
| 8,905,317 | B1 | 12/2014 | Hsu et al. | |
| 8,922,066 | B2 | 12/2014 | Kesler et al. | |
| 9,072,973 | B2 * | 7/2015 | Elliott | A63F 13/00 |
| 9,385,789 | B1 | 7/2016 | Van Bosch et al. | |
| 10,315,119 | B2 * | 6/2019 | Reiche | A63F 13/95 |
| 10,581,140 | B2 | 3/2020 | Lee et al. | |
| 10,758,828 | B1 * | 9/2020 | Howell | A63F 3/00119 |
| 10,821,350 | B1 | 11/2020 | Schukar et al. | |
| 10,857,450 | B1 * | 12/2020 | Aman | A63F 13/213 |
| 10,953,312 | B1 | 3/2021 | Lee | |
| 2004/0214642 | A1 * | 10/2004 | Beck | A63H 3/28 |
| | | | | 463/40 |
| 2011/0028219 | A1 * | 2/2011 | Heatherly | A63F 13/216 |
| | | | | 463/42 |
| 2011/0068178 | A1 | 3/2011 | Gebhart | |
| 2011/0204565 | A1 | 8/2011 | Gelinotte et al. | |
| 2012/0077593 | A1 | 3/2012 | Sarmenta | |
| 2014/0065948 | A1 | 3/2014 | Huang | |
| 2014/0113552 | A1 * | 4/2014 | Siddiqui | H04B 5/0056 |
| | | | | 455/41.1 |
| 2014/0225922 | A1 * | 8/2014 | Sbardella | G06T 19/20 |
| | | | | 345/633 |
| 2014/0287274 | A1 | 9/2014 | Hwang | |
| 2014/0378022 | A1 * | 12/2014 | Muthyala | A63H 33/06 |
| | | | | 446/91 |
| 2015/0130790 | A1 * | 5/2015 | Vasquez, II | G06T 19/006 |
| | | | | 345/419 |
| 2015/0328541 | A1 * | 11/2015 | Van Haaften | A63F 1/02 |
| | | | | 463/42 |
| 2016/0121229 | A1 | 5/2016 | Guo | |
| 2016/0136534 | A1 | 5/2016 | Earl-Ocran | |
| 2016/0254678 | A1 | 9/2016 | Standke et al. | |
| 2016/0314609 | A1 * | 10/2016 | Taylor | A63F 13/65 |
| 2016/0328639 | A1 | 11/2016 | Cohn | |
| 2017/0040665 | A1 | 2/2017 | Takashima et al. | |
| 2017/0216728 | A1 * | 8/2017 | Logan | A63F 13/213 |
| 2018/0018551 | A1 | 1/2018 | Carrier et al. | |
| 2018/0062704 | A1 | 3/2018 | Singh et al. | |
| 2018/0121780 | A1 | 5/2018 | Rosenholtz | |
| 2018/0137971 | A1 | 5/2018 | Jang | |
| 2018/0214788 | A1 | 8/2018 | Hornsby et al. | |
| 2018/0290068 | A1 | 10/2018 | Moody | |
| 2018/0323494 | A1 | 11/2018 | Seong et al. | |
| 2019/0009168 | A1 | 1/2019 | Aman et al. | |
| 2019/0009169 | A1 * | 1/2019 | Kessler | A63H 33/042 |
| 2019/0095770 | A1 | 3/2019 | Lewis et al. | |
| 2020/0251929 | A1 | 8/2020 | Partovi | |
| 2021/0184756 | A1 | 6/2021 | Nocon et al. | |
| 2021/0225585 | A1 | 7/2021 | Lee | |
| 2021/0320535 | A1 | 10/2021 | Draak et al. | |
| 2022/0077895 | A1 | 3/2022 | Harney | |
| 2022/0094424 | A1 | 3/2022 | Nocon et al. | |
| 2022/0300721 | A1 | 9/2022 | Harney | |

OTHER PUBLICATIONS

"Lego partners with Apple to add augmented component to physical playsets," by Gabe Gurwin, Jun. 4, 2018. Source: https://www.digitaltrends.com/gaming/lego-partners-with-apple-ultimate-ar-toy/ (Year: 2018).*

"Lego's Latest Playset Has Kids Battling Ghosts in AR," by Allison Hollender, Aug. 6, 2019. Source: https://vrscout.com/news/lego-hidden-side-ar-playset/ (Year: 2019).*

U.S. Appl. No. 16/714,280, Entitled "Near Field Communication Antenna System for a Playset", Filed Dec. 13, 2019.

* cited by examiner

VIRTUAL PRESENTATION OF A PLAYSET

BACKGROUND

Playsets having interactive features provide a user with an enhanced user experience. For example, playsets may include video and/or and sound playback features that may be triggered based on a user's actions. A user may insert an object (e.g., a play piece or game piece) within a playset and the playset may initiate video playback and/or sound playback in response. In current implementations, the video and sound playback files are stored within a memory of the playset, limiting the number of available video and sound playback files due to the cost of memory. However, if the same video and sound playback are reused, the interactive features may become repetitive, negatively impacting the user's experience with the playset. Further, as the playset controls the playback of the video or sound files, the playset is required to be powered. In many instances playsets are powered though the use of replaceable or rechargeable batteries. Due to the limitations of the batteries, a user is required to frequently recharge or replace the batteries, further negatively impacting the user's experience with the playset.

Thus, there is a need for improved method for interacting with a playset to improve the user experience.

SUMMARY

In one embodiment a method for interacting with a playset comprises acquiring, using a sensor on a mobile device, data corresponding to the playset, and selecting a virtual presentation to display on the mobile device based on the data. The method further comprises displaying, on the display, the virtual presentation while the mobile device is mounted with the playset. The virtual presentation comprises virtual content corresponding to at least one of an interior of the playset and a first physical object.

In one embodiment a computer program product for interacting with a playset comprises a computer-readable storage medium having computer-readable program code embodied therewith. The computer-readable program code executable by one or more processors to acquire, using a sensor on a mobile device, data corresponding to the playset, and select a virtual presentation to display on the mobile device based on the data. The computer-readable program code is further executable by one or more processors to display, on the display, the virtual presentation while the mobile device is mounted with the playset. The virtual presentation comprises virtual content corresponding to at least one of an interior of the playset and a first physical object.

In one embodiment, a mobile device comprises a sensor, a memory, a controller, and a display. The memory comprises a plurality of virtual presentations. The controller is configured to acquire, using the sensor, data corresponding to a playset, and select a virtual presentation from the plurality of virtual presentations based on the data. The display is configured to display the virtual presentation while the mobile device is mounted with the playset. The virtual presentation comprises virtual content corresponding to at least one of an interior of the playset and a first physical object.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Interactive playsets provide a user an improved user experience as compared to playsets that do not include interactive capabilities. However, current interactive playsets have limitations that negatively impact the user experience such as limited video or sound playback options and frequent charging or replacement of batteries. In the following description, an improved playset and method for interacting with a playset is described where a mobile device is used in the interaction of the playset, providing the interactive features to the playset. Accordingly, the interactive features of the playset are increased from those using other designs. Further, as the playset no longer provides the interactive elements, batteries may be omitted from the playset, decreasing the cost of the playset.

Figure 1A:
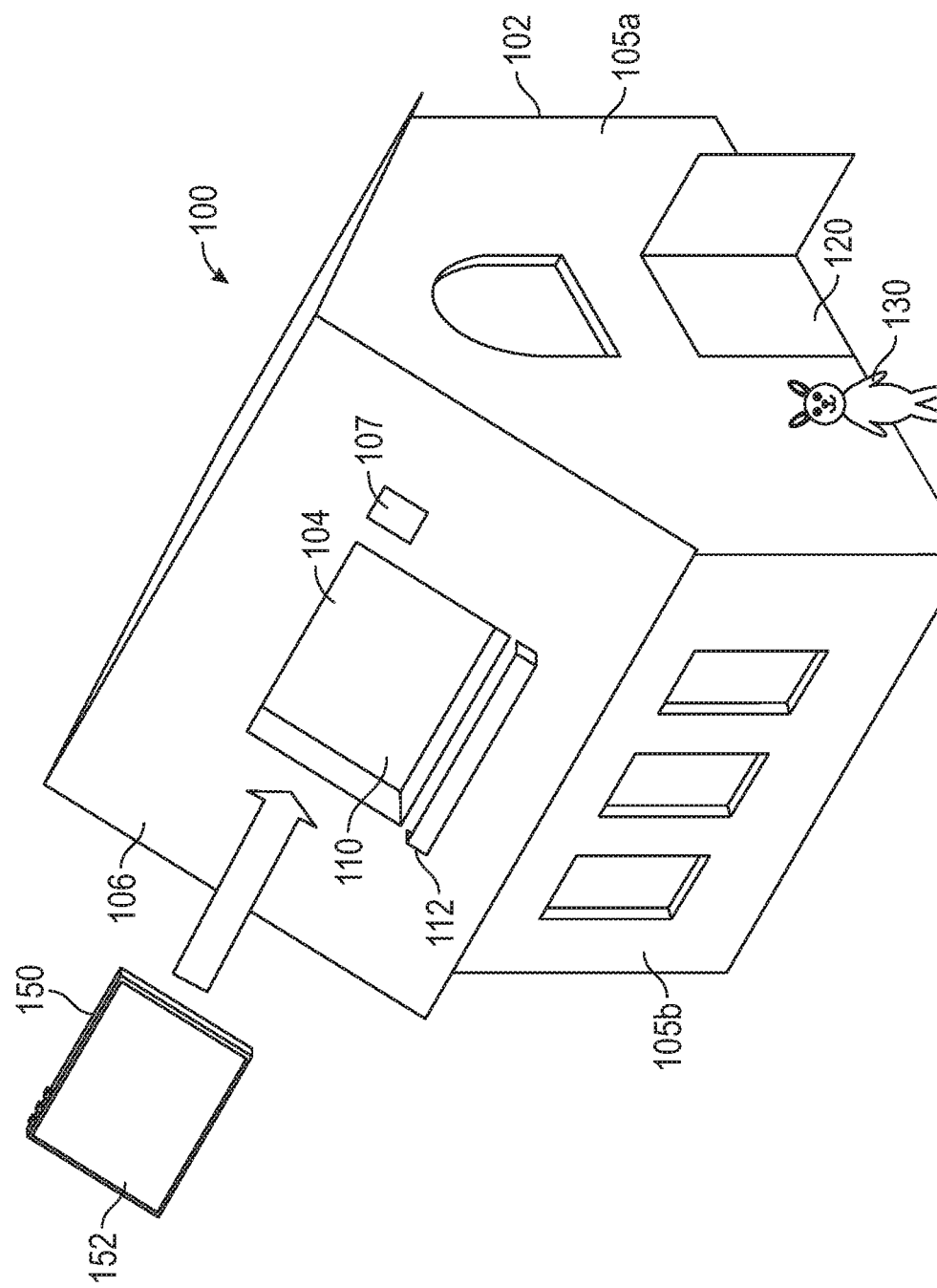
FIGS. 1A and 1B are illustrations of a playset, according to one or more embodiments.

FIG. 1A illustrates a playset 100, according to one or more embodiments. The playset 100 may have various different forms and/or sizes. For example, as illustrated by FIG. 1A, the playset 100 is in the shape of a house. However, in other embodiments, the playset 100 may be a castle, a store, a restaurant, an attraction, a place of interest, and a garage, among others. The playset 100 includes a structure 102 that includes walls 105 and roof 106, which collectively form one or more interior rooms (not shown). Further, the housing includes a plurality of openings, e.g., openings 110 and 120. In other embodiments, the playset 100 may include more or less walls than illustrated in FIG. 1A. Further, in one or more embodiments, the roof 106 may have a different shape and/or include additional features (e.g., spires, towers, or the like).

Figure 1B:
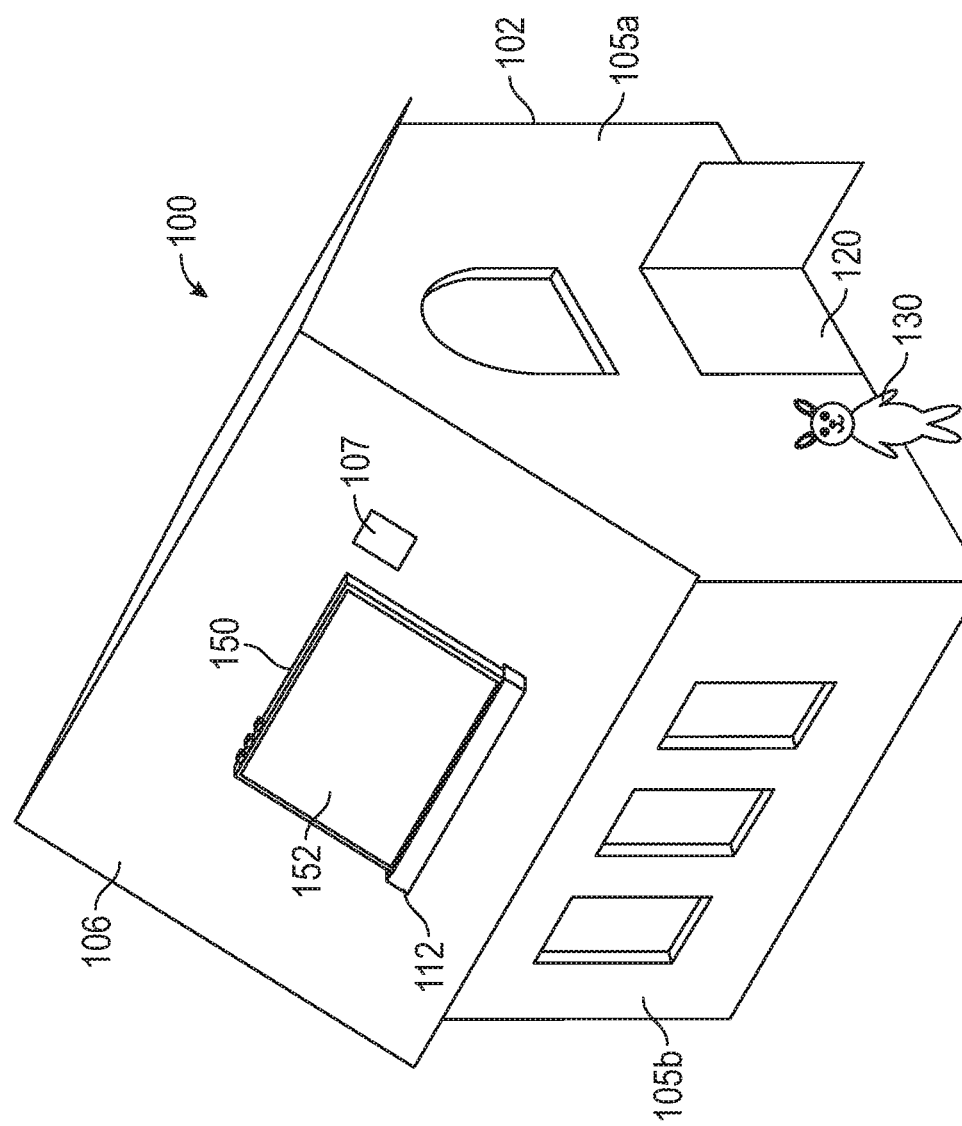

The openings 110 and 120 provide access to an interior (e.g., an interior region) 104 of the playset 100. The opening 110 is located within the roof 106 and is sized to allow at least a portion of a mobile device, e.g., the mobile device 150, to be exposed to the interior of the playset 100. For example, the opening 110 may be sized such that a sensor of a mobile device is exposed to and able to access the interior of the playset 100. FIG. 1B illustrates the mobile device 150 mounted to the roof 106 and over the opening 110.

The playset 100 may include a support element 112. The support element 112 may be positioned on the roof 106 around one or more sides of the opening 110. Further, the support element 112 may include one or more support elements configured to maintain the position of the mobile device 150 over the opening 110. For example, the mobile device 150 may rest on the support element 112 (e.g., a ledge or holder in which a bottom portion of the mobile device 150 is inserted) such that the mobile device 150 is positioned over the opening 110. When positioned over the opening 110, one or more sensors of the mobile device 150 may be able to interact with (e.g., image, scan, or the like) objects of the interior 104. In one embodiment, the length and/or width of the opening 110 is smaller than the length and width of the mobile device 150 so that the mobile device 150 does not fall into the interior of the structure 102.

In various embodiments, the opening 110 and the support element 112 may be positioned along more of the walls 105 instead of the roof 106.

The opening 120 provides access to the interior 104. For example, one or more objects or toys (e.g., the object 130) may be positioned within or removed from the interior 104 through the opening 120. The opening 120 may be a door, window, or another type of opening. In various embodiments, the playset 100 includes three or more openings. For example, the playset 100 includes the openings 110, 120 and one or more additional openings. The additional openings may be located within the walls 105 and/or the roof 106.

The playset 100 may additionally include an identification tag 107. The identification tag 107 may be a near-field communication (NFC) tag. The NFC tag may also be a radio-frequency identification (RFID) tag or a Bluetooth low energy (BLE) tag, among others. The identification tag 107 may be a passive device, and thus, not powered by batteries. Alternatively, the identification tag 107 may be an active device powered by a power supply (e.g., one or more batteries or wirelessly acquired) of the structure 102. In one or more embodiments, the identification tag 107 communicates with the mobile device 150. For example, the identification tag 107 may communicate data corresponding to the playset 100 to the mobile device 150. In other embodiments, the identification tag 107 may be a barcode, QRcode (e.g., a multi-dimensional barcode), glyph, etc. readable by the mobile device 150.

Figure 3:
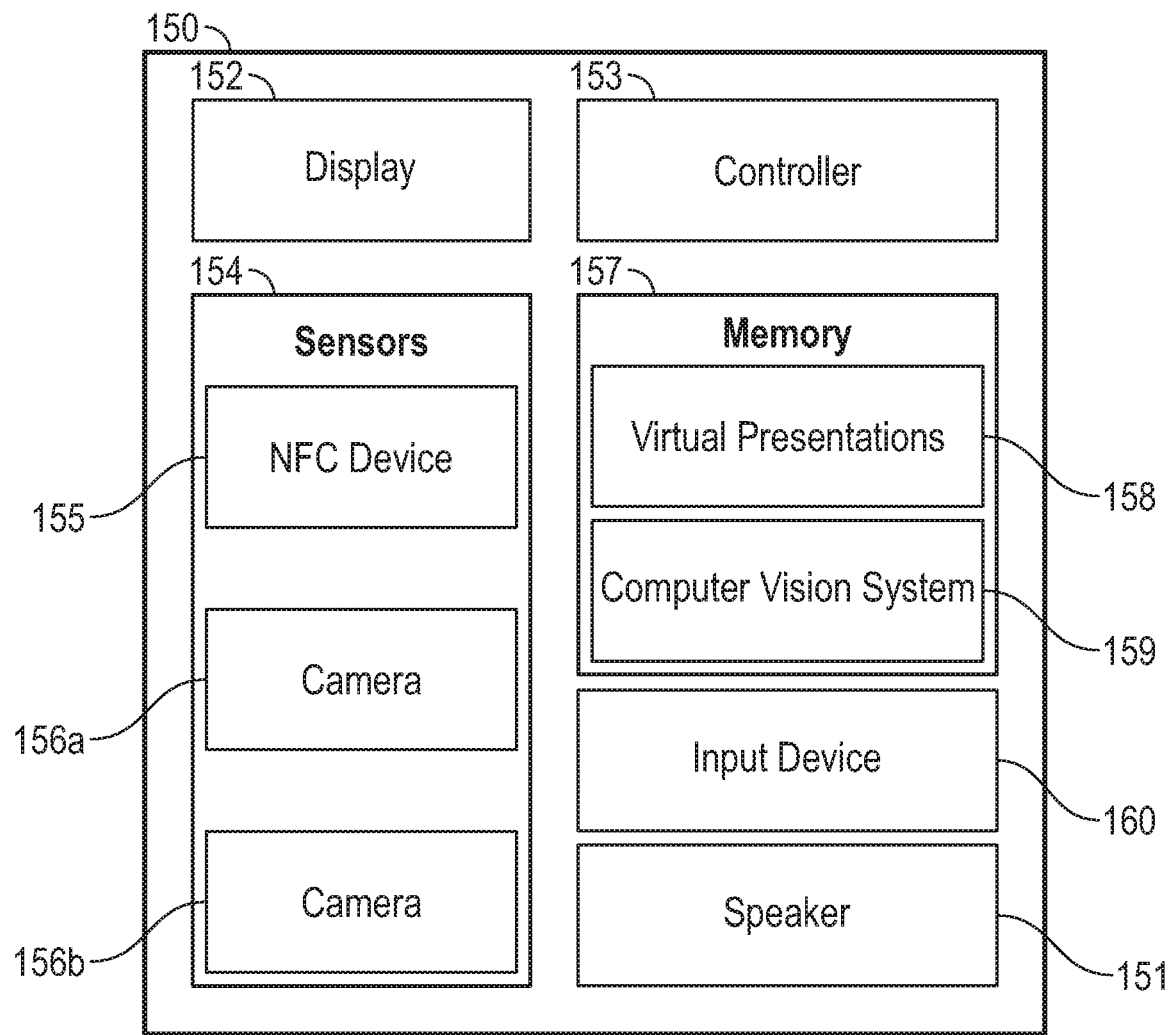
FIG. 3 is a schematic block diagram of a mobile device, according to one or more embodiments.

The mobile device 150 may be a mobile phone or a tablet, among others. In one embodiment, as illustrated in FIG. 3, the mobile device 150 comprises a display 152 configured to present a virtual presentation of the interior 104. The virtual presentation may be an augmented version of the interior 104. For example, the virtual presentation may include a combination of physical objects and features actually in the interior 104 and details and/or elements not present within the interior 104. The latter details and elements being virtual augmentations to the virtual presentation. Further, the virtual presentation may correspond to the type of the playset. For example, if the type of the playset is determined to be a castle, the virtual presentation may depict an interior of a castle.

Figure 2A:
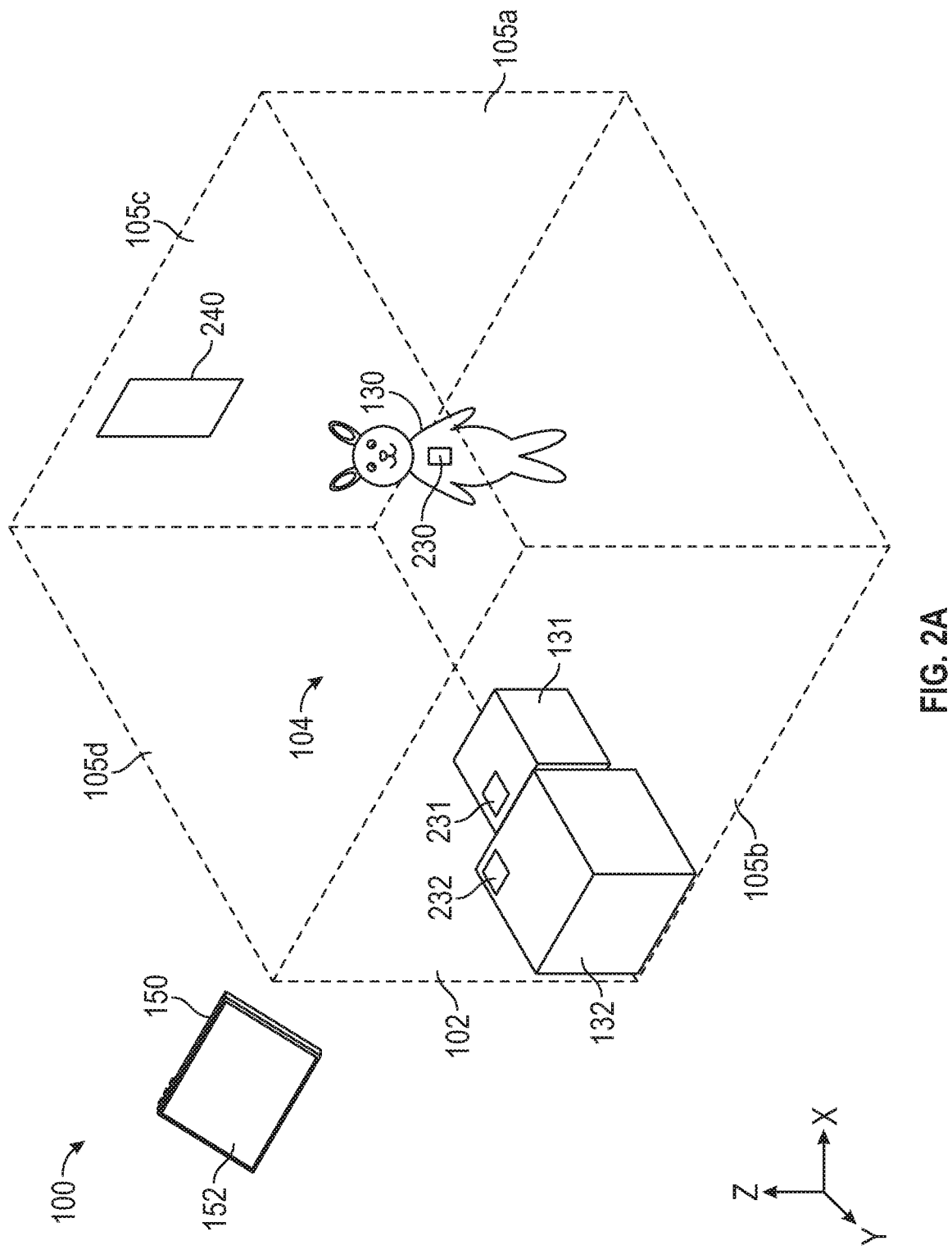
FIG. 2A is an illustration of an interior of a playset, according to one or more embodiments.

FIG. 2A illustrates the interior 104 of the playset 100, according to one or more embodiments. As illustrated, the walls 105 and the roof 106 have been made transparent such that a view of the interior 104 is unobstructed to visual inspection from the exterior. Further, in the embodiment of FIG. 2A, the object 130 is positioned within the interior 104. Additionally, objects 131 and 132 are positioned within the interior 104. The object 130 may include identification tag 230, the object 131 may include the identification tag 231, and the object 132 may include the identification tag 232. Alternatively, one or more of the objects 130, 131, and 132 may omit a corresponding identification tag. Further, one or more of the identification tags 230, 231, and 232 may be NFC tags. For example, the identification tags 230, 231, and 232 may be one of an RFID tag, and a BLE tag, among others. In other embodiments, one or more of the identification tags 230, 231 and 232 may include a barcode, QRcode, or glyph, among others. While in the embodiment of FIG. 2A, three objects are included within the interior 104, in other embodiments, more than three objects or less than three objects may be included within the interior 104. Further, in one or more embodiments, the objects 131 and 132 may comprise a substantially similar shape (e.g., a cube). However, in other embodiments, the objects 131 and 132 may differ in shape. Further, the size of the objects 131 and 132 may differ or be the same.

In one embodiment, the identification tags 230, 231, and 232 include identification information of the objects 130, 131, and 132, respectively. The information may be utilized by the mobile device 150 to select and/or generate a virtual presentation. In one or more embodiments, one or more of the objects 131 and 132 may have a shape, size and/or element that may be identified by the mobile device 150 and utilized by the mobile device 150 to select and/or generate a virtual presentation to be displayed by the display 152 of the mobile device 150.

The playset 100 may additionally include identification tag 240. The identification tag 240 may be utilized by the mobile device 150 to select and/or generate a virtual presentation to be displayed by the display 152 of the mobile device 150. For example, the identification tag 240 may have one or of a size, shape, and or element that may be identified by the mobile device 150 and utilized to select a virtual presentation to be displayed. In various embodiments, the playset 100 may include more than one identification tag 240.

Figure 2B:
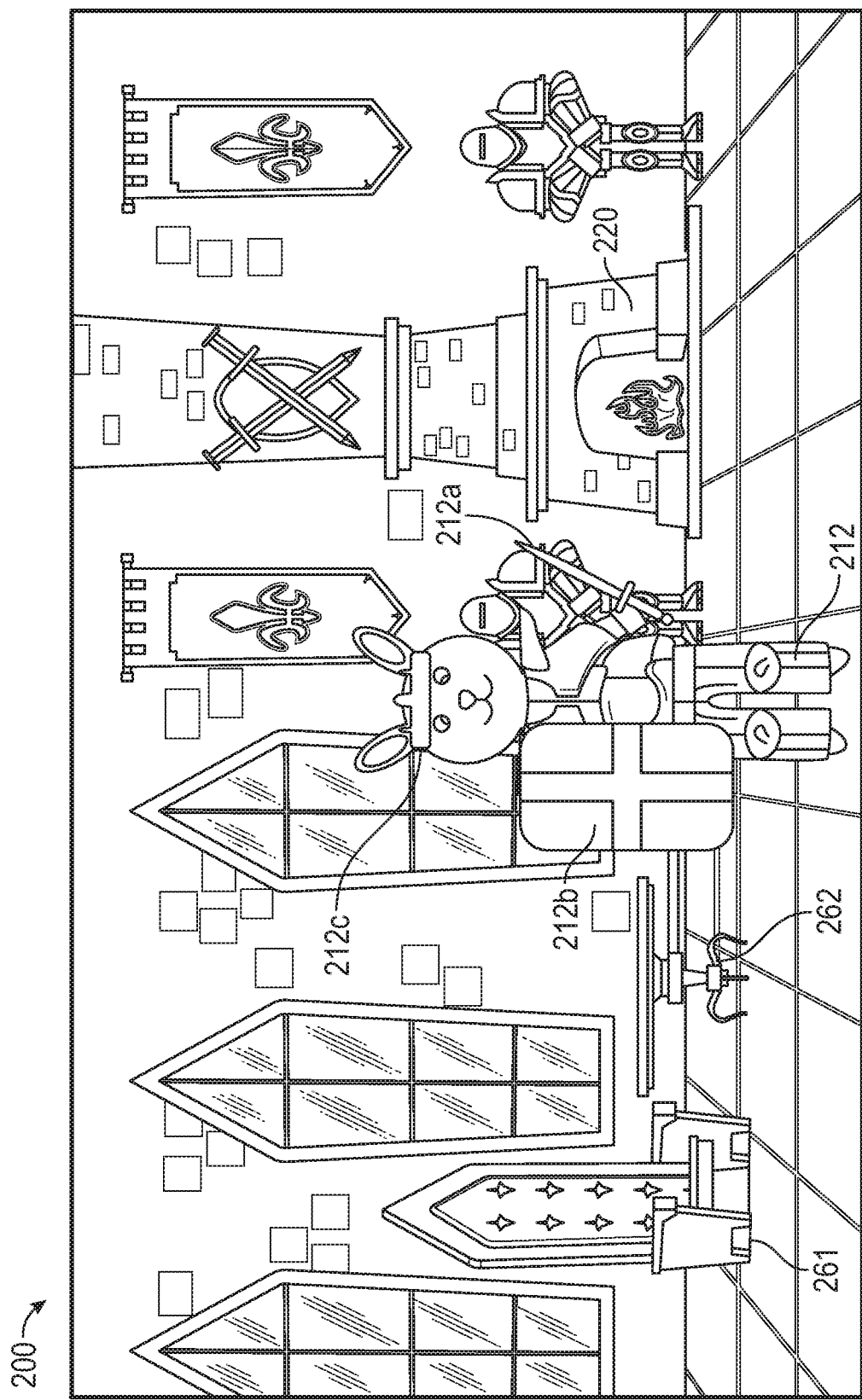
FIG. 2B depicts a virtual presentation, according to one or more embodiments.

FIG. 2B illustrates virtual presentation 200, according to one or more embodiments. The virtual presentation 200 is displayed on the display 152 based on the data acquired by the mobile device 150. Further, the virtual presentation 200 may be displayed on the display 152 of the mobile device 150 while the mobile device 150 is mounted to the roof 106 of the playset 100, as illustrated in FIG. 2B. The virtual presentation 200 comprises virtual content. For example, the virtual presentation 200 may comprise virtual objects 212, 261, and 262. Further, the virtual presentation 200 is an augmented view of the interior 104 of the playset 100. For example, in response to determining the playset 100 corresponds to a castle, a virtual presentation 200 of an interior view of a castle is displayed. The objects 130, 131, 132 in FIG. 2A may also be represented within the virtual presentation 200 by virtual objects 212, 261, 262, respectively. That is, the objects 130, 131, and 132 are presented with augmented features. For example, in the virtual presentation 200, the physical object 130 is displayed as including elements 212a-212c to form a virtual version (e.g., virtual object 212) of the physical object 130. Further, the objects 131 and 132 are displayed as virtual objects (elements) 261, 262, respectively, within the virtual presentation 200. In one embodiment, the virtual objects 261 and 262 have a different shape and/or color from the objects 131, 132. For example, the virtual object 261 is depicted as a chair while the physical object 131 is a cube. Further, the virtual object 262 is depicted as a table while the physical object 132 is a cube. Depending on the selected virtual presentation, objects 131 and 132 may be presented differently. The number of objects within the virtual presentation 200 may correspond to the number of objects within the interior 104. Additionally, the location of the objects within the virtual presentation 200 may correspond to the location of corresponding objects within the interior 104. The location of the objects within the interior 104 may be determined by the mobile device 150 based on sensor data received from one of the sensors 154.

In one or more embodiments, the virtual presentation 200 may additionally include a virtual fireplace 220 having a virtual burning fire. For example, one or more of the objects of the playset 100 may be a fireplace. The mobile device 150 may determine that the sensor data received from an object of the playset 100 identifies a fireplace. Accordingly, a virtual presentation comprising a fireplace having a burning fire based on sensor data may be selected and displayed by the display 152 of the mobile device 150. Similarly, virtual presentations having other virtual objects with motion may be selected based on data acquired by the mobile device 150. For example, a virtual presentation comprising virtual content including flowing water may be selected when one or more of the objects of the playset 100 is identified as including or corresponding to a water feature (e.g., a fountain, a stream, or the like).

The virtual presentation 200 simulates a view of the interior of the playset 100 that includes physical objects with added augmented reality (AR) features or a view made completely from virtual reality (VR) elements that may not look like the physical objects (e.g., objects 130, 130, and/or 132) within the playset 100. Thus, the mobile device 150 can provide a very different view of the interior of the playset 100 relative to when the mobile device 150 is not placed in the opening 110. Further, leveraging the memory 157 and display 152 of the mobile device 150 enhances the user experience with the playset 100 without adding additional cost to the playset 100.

FIG. 3 illustrates a schematic block diagram of the mobile device 150, according to one or more embodiment. The mobile device 150 may include one or more sensors 154. The sensors 154 may include one or more of an NFC device 155, a camera 156a, and a camera 156b. The NFC device 155 may also be a RFID device, or a BLE device, among others. Further, the NFC device 155 may include a reader configured to acquire information from an NFC object or element. In embodiments where the NFC device 155 is an RFID device, the NFC device 155 includes an antenna. In one embodiment, the NFC device 155 is a barcode reader. In one or more embodiments, the mobile device 150 includes more than one NFC device 155.

The mobile device 150 further includes a controller 153. The controller 153 may be any general purpose processor. For example, the controller 153 may be a central processing unit (CPU) of the mobile device 150. Further, the mobile device 150 may include memory 157. The controller 153 may be communicatively coupled with the memory 157. The memory 157 may be a computer readable storage medium. The memory 157 may store a plurality of virtual presentations 158 that are selected by the controller 153. Further, the memory 157 may store a computer vision system 159 configured to identify one or more physical objects and/or features of physical objects from sensor data acquired by one or more of the cameras 156a, 156b. For example, the computer vision system 159 may receive data received from one or more of the sensors, process the data to detect one or more possible objects, and compare the possible objects to example data to determine whether or not the possible objects are actual objects and/r to identify the object.

The mobile device 150 may additionally include an input device 160. The input device 160 may be a touch sensor (touch interface), a mouse, or keyboard, among others. The input device 160 receives input provided by a user which may be used by the controller 153 to augment the virtual presentation displayed on the display 152. For example, the input device 160 may be a touch sensor that acquires input data (e.g., location and/or movement data) for one or more input objects (e.g., a user's digits or a stylus) and based on the input data, the virtual presentation (e.g., the virtual presentation 200) may be altered. Altering the virtual presentation may comprise one or more of enlarging a portion of a virtual presentation, minimizing a portion of a virtual presentation, altering a position of a virtual representation of an object, e.g., the virtual object 212, and imparting motion on a virtual representation of an object. In one or more embodiments, a video file and/or a sound file may be played based on input data received by the input device 160.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, or a floppy disk, among others. The memory 157 retains and stores instructions executable by the controller 153. Additionally, one or more applications may be stored within the memory 157. The applications may be executable by the controller 153.

In various embodiments, the sensors 154 may be utilized to scan or image the interior 104 acquire data corresponding to the playset 100 and/or one or more objects within the interior 104. The mobile device 150 may determine a type of playset based acquired data. Further, the mobile device 150 generates a virtual presentation of the playset 100 based on the acquired data.

Figure 4:
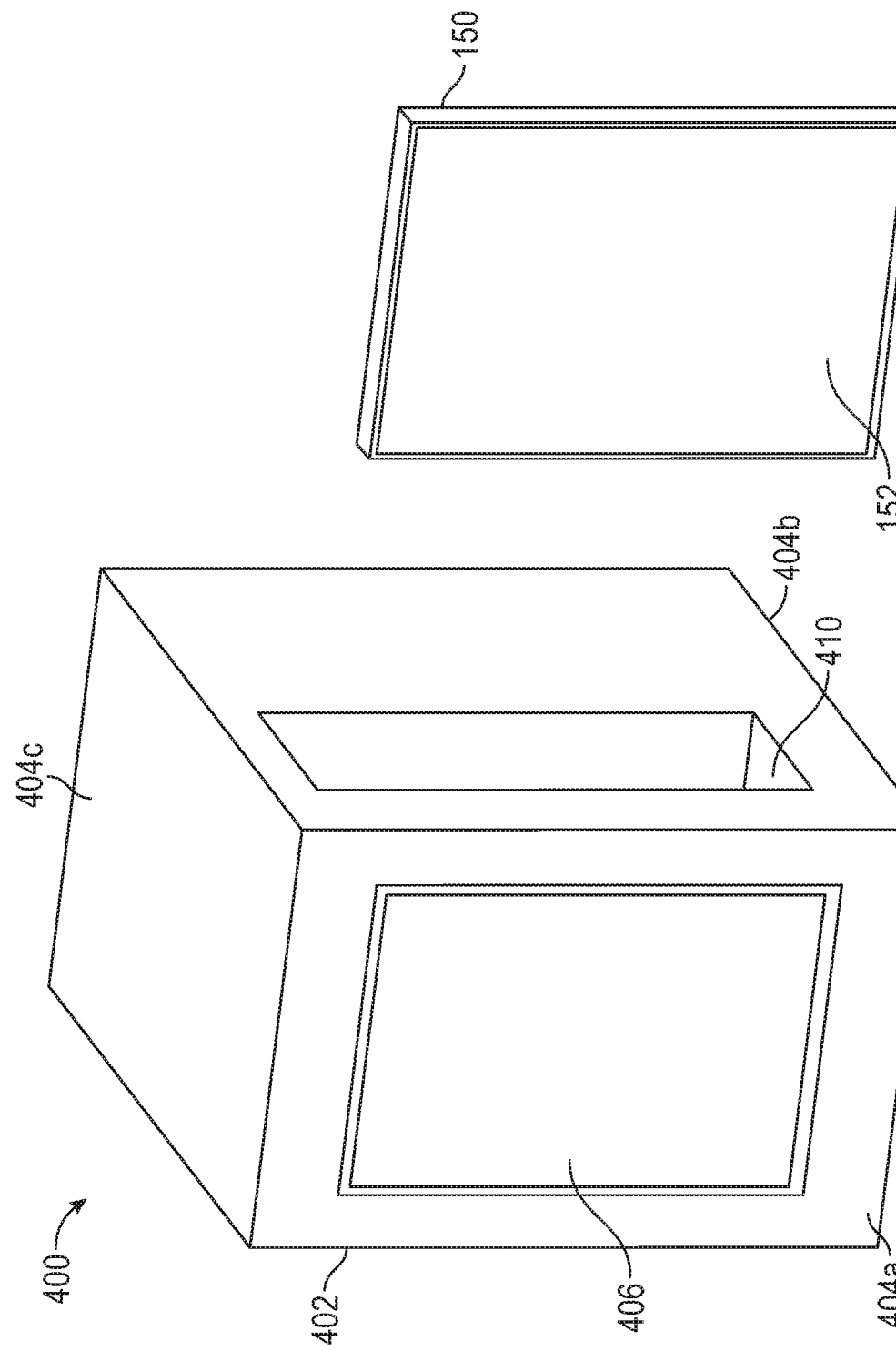
FIGS. 4 and 5 are illustrations of a playset, according to one or more embodiments.

FIG. 4 illustrates a front view of a playset 400, according to one or more embodiments. The playset 400 may have various different forms and/or sizes like the playset 100 described in FIG. 1A. The playset 400 includes structure 402. The structure 402 includes surfaces 404a, 404b, and 404c. The surface 404b includes opening 410 and the surface 404a includes a window 406. The opening 410 is sized so that the display 152 of the mobile device 150 is viewable through the window 406. The mobile device 150 generates a virtual presentation of the object 130 and/or other objects of within the playset 400 based on data acquired by a sensor of the mobile device 150. As described with regard to FIGS. 1, 2A, and 2B, the virtual presentation may include an augmented version of an object or objects within the playset 400. The virtual presentation simulates a view of the interior region of the playset 400 that includes physical objects with added AR features or a view made completely from VR elements that do not look like the physical objects within the playset 400. Thus, the mobile device 150 can provide a very different view of the interior of the playset 400 relative to what a viewer sees when the mobile device 150 is not placed in the opening 410. Accordingly, the user experience with the playset 400 is enhanced by leveraging the memory 157 and display 152 of the mobile device 150 without adding additional cost to the playset 400 (e.g., without adding a display and memory for presenting the virtual presentation).

In one or more embodiment, the input device 160 of the mobile device 150 acquires input data which may be used by the controller 153 to augment the virtual presentation displayed on the display 152 of the mobile device 150. For example, a user may interact with the input device 160 of the mobile device 150 via the window 406.

Figure 5:
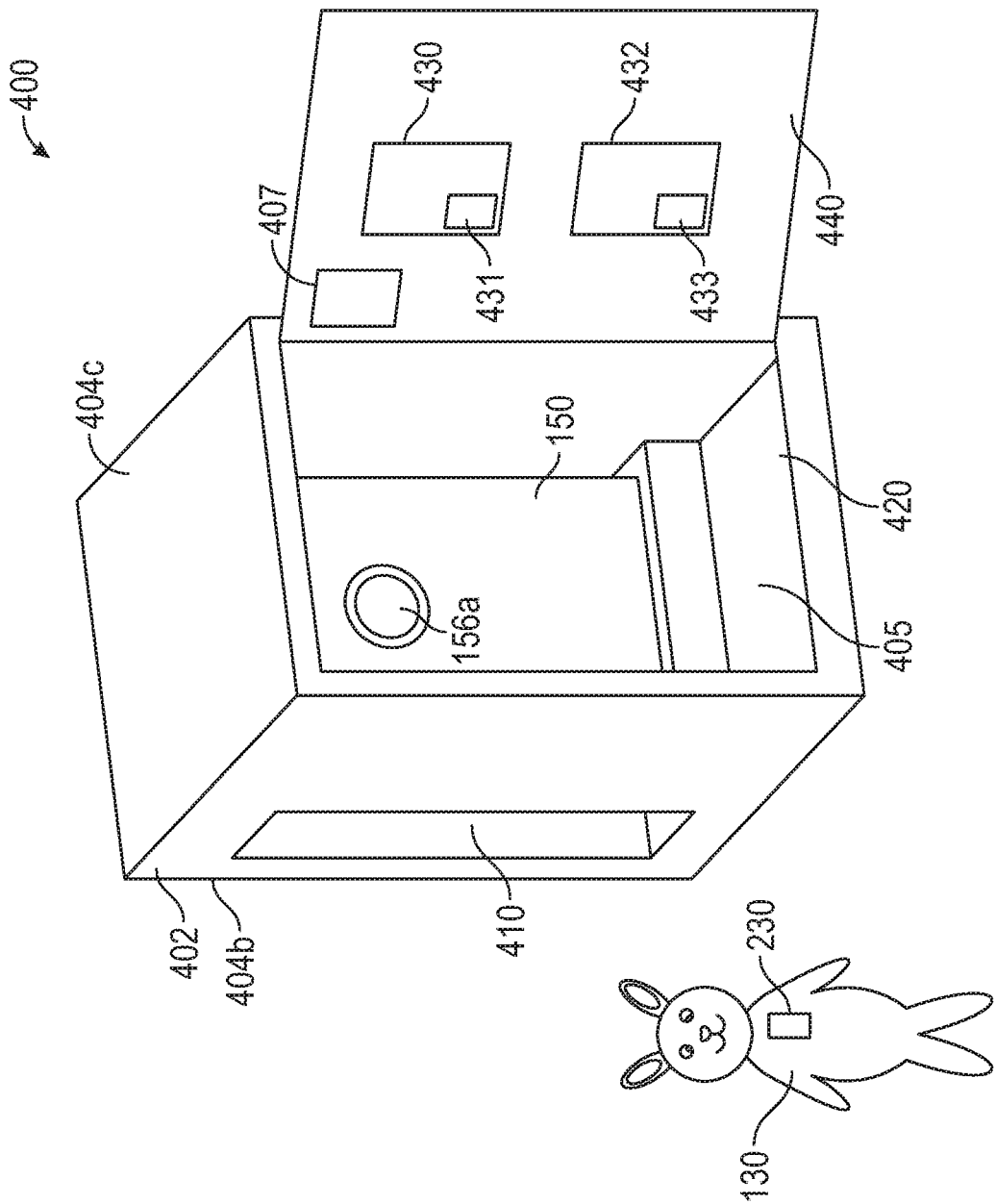

FIG. 5 illustrates a rear view of the playset 400, according to one or more embodiments. As illustrated, the playset 400 includes opening 420. The opening 420 provides access to the interior 405 of the structure 402. For example, the object 130 may be inserted into the interior 405 via the opening 420. Further, objects 430 and 431 may be inserted into the interior 405 via the opening 420. In one embodiment, the objects 430 and 431 may be mounted on a door 440 of the structure 402. The objects 430 and 432 may include identification tags 431 and 433. The identification tags may be configured similar to that of the identification tags 231 and 232. In one embodiment, one or more of the objects 430 and 432 may omit the identification tags 431 and 433, respectively. Further, the identification tags 431 and 433 may contain identification information corresponding to the objects 430 and 432, respectively, which may be utilized by the mobile device 150 to identify the objects 430 and 432 and/or generate a virtual presentation. The playset 400 may additionally include the identification tag 407. The identification tag 407 may be configured similar to that of the identification tag 107. Further, the identification tag 407 may be utilized by the mobile device 150 to determine the type of the playset 400 and/or generate the virtual presentation. In various embodiments, the playset 400 may include more than one identification tag 407.

In one or more embodiments, the mobile device 150 displays a virtual presentation based on the object 130, and 430, and 432. The virtual presentation displayed on the display 152 of the mobile device 150 is viewable through the window 406. In one or more embodiments, the virtual presentation includes an augmented version of object 130. The augmented version of object 130 may be generated based on data received from one or more of the identification tags 407, 431, and 432. For example, the virtual presentation may include virtual content corresponding to the object 130 and one or more of the objects 430 and 432.

Figure 6A:
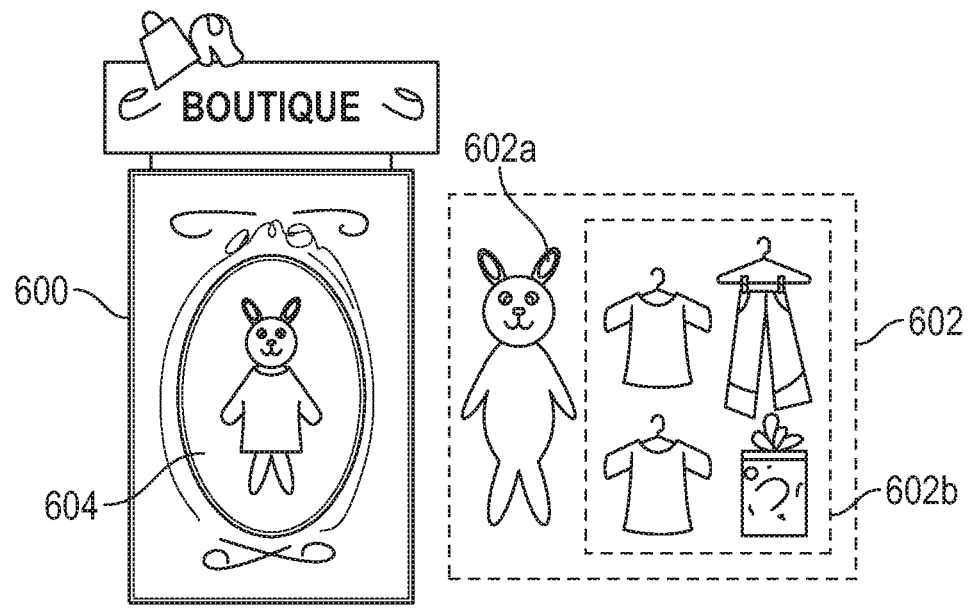
FIGS. 6A, 6B, and 6C are illustrations of a playset, according to one or more embodiments.

FIG. 6A illustrates playset 600 and objects 602. The playset 600 may be configured similar to that of the playset 400. Further, the virtual presentation 604 displayed on the display 152 may correspond to one or more of the type of the playset 600 and data received from the objects 602. For example, the type of the playset 600 may be determined to be a boutique. The type of playset 600 may be determined based on data acquired from the objects 602 and/or an identification tag of the playset 600. The objects 602 may include clothes and other objects that when identified by a mobile device (e.g., the mobile device 150) may alter the appearance of the object within a virtual presentation 604. For example, the virtual presentation 604 may include an augmented view of the object 602a based on one or more of the objects 602b. In the illustrated embodiment, the object 602a is shown as wearing one or more of the objects 602b.

Figure 6B:
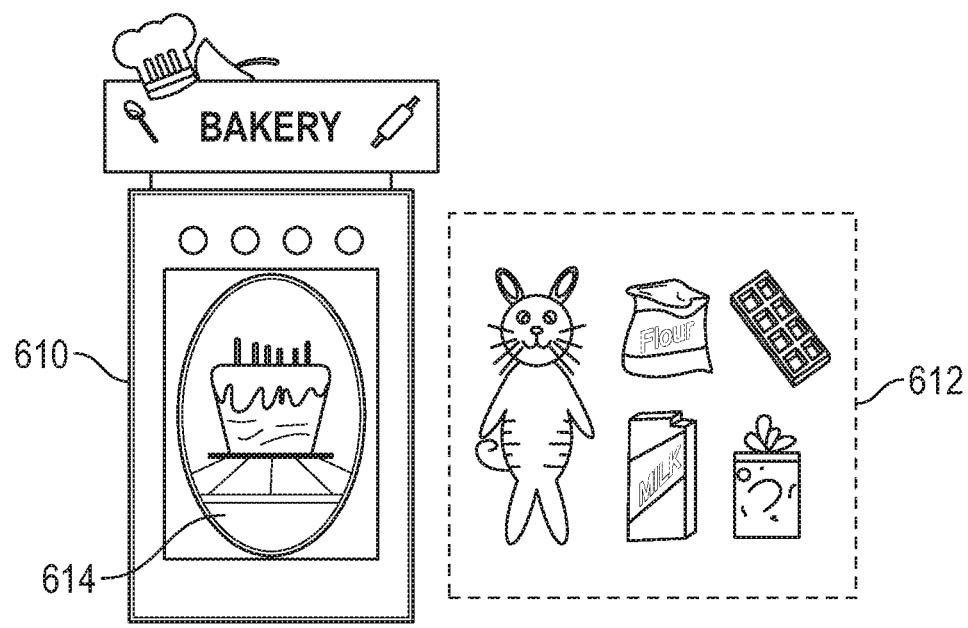

FIG. 6B illustrates playset 610 and objects 612. The playset 610 may be configured similar to that of the playset 400. Further, the virtual presentation 614 displayed on the display 152 may correspond to one or more of the type of the playset 610 and data received from the objects 612. For example, the type of the playset 610 may be determined to be a bakery. The type of playset 600 may be determined based on data acquired from the objects 612 and/or an identification tag of the playset 610. The virtual presentation 614 may include an augmented view of one or more of the objects 612. Alternatively, the virtual presentation 614 may include an object generated based on data received corresponding to the objects 612. For example, the virtual presentation 614 includes a cake generated in response to the objects 612 being identified as ingredients corresponding to the cake. In or more embodiments, a user may collect objects corresponding to the ingredients of a cake. The ingredients may be part of a recipe. The user may place the objects within the structure of a playset (e.g., the playset 400) to be identified by a mobile device (e.g., the mobile device 150). In response, the mobile device 150 may display a virtual presentation including virtual content corresponding to the objects.

Figure 6C:
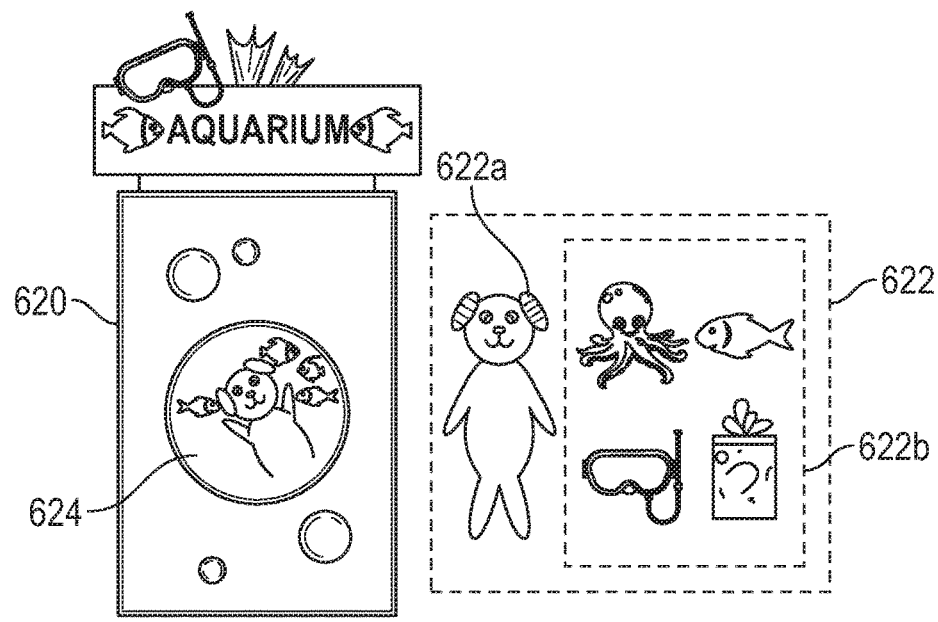

FIG. 6C illustrates playset 620 and objects 622. The playset 620 may be configured similar to that of the playset 400. The virtual presentation 624 may be generated based on data corresponding to the playset 620 and/or the objects 622. For example, the data corresponding to the playset 620, the objects 622 and/or an identification tag of the playset 610 may be utilized by the mobile device 150 to identify the type of the playset 620 as being an aquarium. Accordingly, a corresponding virtual presentation 624 is displayed by the mobile device 150. In one embodiment, the virtual presentation 624 includes a virtual presentation of object 622a augmented by one or more of the objects 622b. For example, the virtual presentation 624 may include a presentation of the object 622a augmented to include one or more of the objects 622b. In one embodiment, the presentation of the object 622a may be augmented to be wearing one or more of the objects 622b and/or interacting with one or more of the objects 622b. In or more embodiments, the objects 622b are accessories for object 622a. A user may place the objects 622 within the structure of a playset (e.g., the playset 400) to be identified by a mobile device (e.g., the mobile device 150). In response, the mobile device 150 may display a virtual presentation including virtual content corresponding to a virtualized version of the object 622a wearing the objects 622b.

One or more of the virtual presentations 604, 614, and 624 may be changed by changing one or more of the objects 602, 612, and 622, respectively. For example, the presentation of the object 602a within virtual presentation 604 may be altered in response to detection that one or more of the objects 602b was changed. In one embodiment, with reference to FIG. 6C, switching one or more of the objects 622b with another object alters the virtual appearance of the object 622a within the virtual presentation 624. Further, one or more of the virtual presentations 604, 614, and 624 may be altered based on input received by the input device 160 of the mobile device 150. For example, the position and/or orientation of a virtual object within a virtual presentation (e.g., the virtual presentations 604, 614, and 624) may be altered based on input received by the input device 160. In one or more embodiments, a video file and/or a sound file may be played based on an input received by the input device 160.

In the embodiments of FIGS. 6A-6C, the housing of the playset (e.g., the structure 402 of the playset 400 of FIG. 4), may include one or more features corresponding to the type of the playset. For example, the housing may include a sign, illustration, and/or shape that correspond to the type of the playset that further enhances the user experience by further immersing a user within the corresponding virtual presentation.

Figure 7:
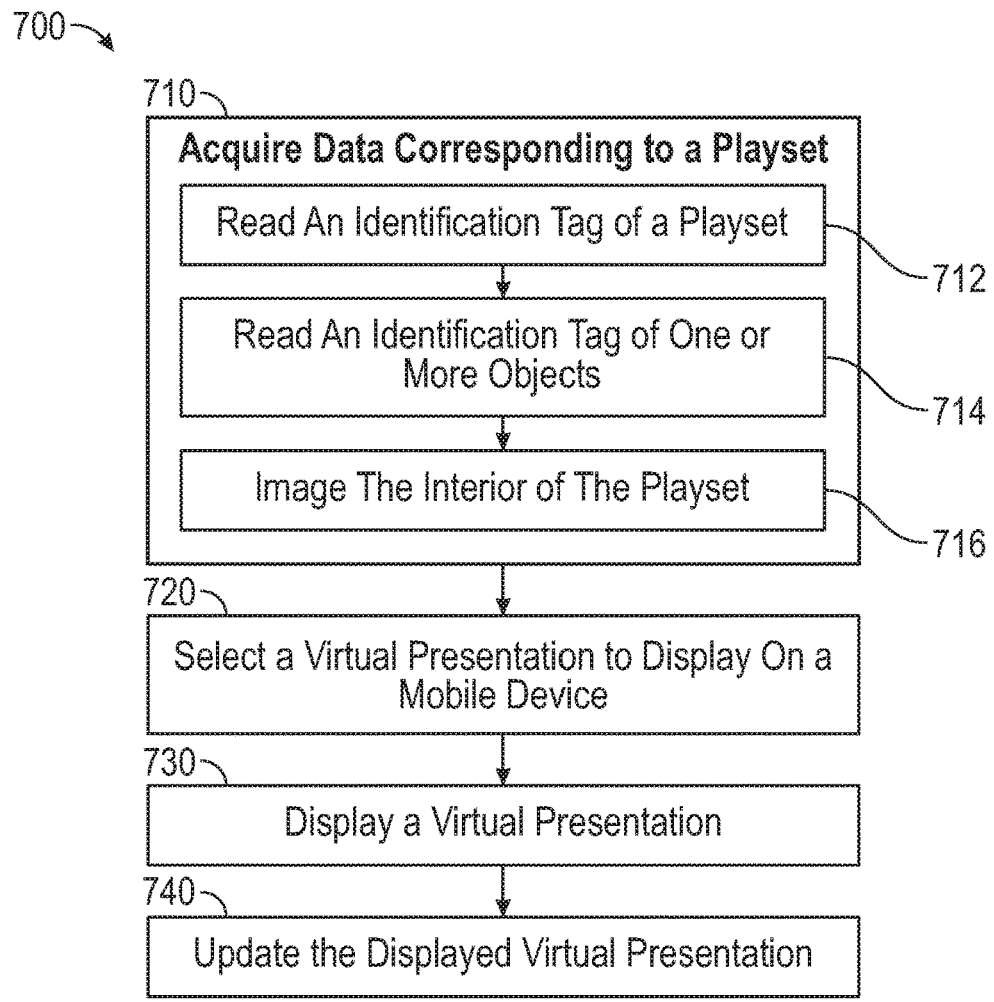
FIG. 7 is a flowchart for a method for interacting with a playset, according to one or more embodiments.

FIG. 7 is a flowchart illustrating a method 700 for interacting with a playset, according to one or more embodiments. At operation 710, the mobile device 150 acquires data corresponding to a playset (e.g., the playset 100, 400). The controller 153 instructs one or more of the sensors to acquire data from the playset. In one or more embodiments, a user may provide instructions to acquire sensor data via an application running on the mobile device 150 and the input device 160.

At operation 712, an identification tag of a playset (e.g., the identification tag 107 of playset 100 or the identification tag 407 of playset 400) is read. With regard to FIG. 1A, the NFC device 155 of the mobile device 150 communicates with the identification tag 107 to acquire data corresponding to the playset 100. In one embodiment, the identification tag 107 is an NFC tag read by the NFC device 155 of the mobile device 150. For example, the identification tag 107 may be a passive NFC tag, and an antenna of the identification tag 107 is powered by a power signal provided by one or more antennas of the NFC device 155 through a wireless coupling. The power signal provides radio energy to the identification tag 107 to power a processor of the identification tag 107. In response to the power signal, the processor of the identification tag 107 is powered and data stored by a memory of the identification tag 107 may be accessed by the processor and wirelessly provided to an antenna of the NFC device 155 in the mobile device 150. In another embodiment, the identification tag 107 is an active tag having a local power source. In such an embodiment, when the NFC device 155 is positioned proximate the identification tag 107, an antenna of the NFC device 155 couples with an antenna of the identification tag 107 and a processor of the identification tag wirelessly communicates data from a memory of the identification tag to the NFC device 155. While the above discussion is directed to the identification tag 107 and the playset 100, a similar description may be applied to the identification tag 407 and the playset 400.

In one or more embodiments, one or more of the identification tags 107 and 407 is a BLE tag and includes a BLE transceiver. In such an embodiment, the BLE transceiver wirelessly communicates with the NFC device 155 of mobile device 150 to communicate data regarding the playset (e.g., the playset 100, 400) from the identification tag.

In other embodiments, one or more of the identification tags 107 and 407 includes a barcode, QRcode, or a glyph, among others, and the camera 156a may be configured to image the barcode, QRcode, or glyph such that the mobile device 150 obtains data corresponding to the playset 100 and 400, respectively.

Further, in various embodiments, the computer vision system 159 may identify the identification tags 107 and 407. For example, the computer vision system 159 receives acquired data from the camera 156a corresponding to the identification tags 107 and 407, processes the acquired data to detect one or more possible objects, and compares the possible objects to templates to identify the identification tags 107 and 407.

In various embodiments, acquiring data from a playset comprises operation 714, reading an identification tag of one or more objects of the playset. For example, the NFC device 155 of the mobile device 150 communicates with one or more of the identification tag 230 of the object 130, the identification tag 231 of the object 131, the identification tag 232 of the object 132, or the identification tag 240 of FIG. 2A. Further, the NFC device 155 of the mobile device 150 communicates with one or more of the identification tag 230 of the object 130, the identification tag 431 of the object 131, and the identification tag 433 of the object 432.

The mobile device 150 may receive data from one or more of the identification tags 230, 231, 232, 240, 431 and 433. For example, in one embodiment, one or more of the identification tags 230, 231, 232, 431 and 433 are passive NFC tags and the NFC device 155 of the mobile device 150 provides a power signal to one or more of the identification tags 230, 231, 232, 240, 431 and 433. In response, a processor of each of the passive identification tags is powered and communicates data stored within a memory of the identification tags to the NFC device 155. In another embodiment, one or more of the identification tags 230, 231, 232, 240, 431 and 433 are active NFC tags and the NFC device 155 of the mobile device 150 receives data from the one or more of the identification tags in response to an antenna of the NFC device 155 coupling to an antenna of the identification tags. Further, in other embodiments, one or more of the identification tags 230, 231, 232, 240, 431 and 433 are BLE devices and communicate information to the mobile device 150 via the NFC device 155. In such an embodiment, the NFC device 155 may be a BLE device configured to receive data from the one or more of the identification tags 230, 231, 232, 240, 431 and 433.

In one or more embodiments, acquiring data corresponding to a playset additionally, or alternatively, includes operation 716. In operation 716, the interior of the playset (e.g., interior 104 of the playset 100 or the interior 405 of the playset 400) is imaged. With reference to FIG. 1A, the mobile device 150 may image the interior 104 of the playset 100 utilizing the camera 156a. In one embodiment, imaging the interior 104 of the playset 100 acquires data corresponding to one or more of the playset 100, the object 130, the object 131 and the object 132. Further, one or more of the objects 130, 131, and 132 may include an identifying element that may be detected by the mobile device 150 when the interior 104 is imaged. The identifying elements may be imaged and utilized by of the mobile device 150 to identify a feature of the playset 100. The identifying elements may be a barcode, QRcode, glyph, or the like. Further, the identifying elements may be a shape of an object, a size of an object, a color of an object, and/or a feature of the object.

In one or more embodiments, the mobile device 150 images the interior 405 of the playset 400 using, e.g., the camera 156a. In one embodiment, the mobile device 150 images the interior 405 of the playset 400 and acquires data corresponding to one or more of the object 130, the object 430 and/or the object 432. For example, one or more of the objects 130, 430, and 432 includes an identifying feature that may be imaged and identified by the mobile device 150. The computer vision system 159 may receive the images and identify one or more of the objects 130, 430, and 432. Further, the computer vision system 159 may detect identifying elements within of the objects 130, 430, and 432 which aid in the identification of the objects. For example, the identifying elements of the objects 130, 430, 432 may be a barcode, QRcode, or glyph, among others. Further, the identifying elements may be a shape of an object, a size of an object, a color of an object, and/or a feature of the object.

In other embodiments, mobile device 150 acquires data corresponding to the position of one or more of the object 130, the object 131, and the object 132 within the interior 104 via the camera 156. Similarly, the mobile device 150 may acquire data corresponding to the position of one or more of the object 130, the object 430, and the object 432 within the interior 405 via the camera 156.

In various embodiments, acquiring data corresponding to a playset includes one or more of operations 712-716. For example, in one embodiment, acquiring data corresponding to a playset comprises at least two of the operations 712-716. In other embodiments, acquiring data corresponding to a playset comprises each of the operations 712-716.

At operation 720, the controller 153 selects a virtual presentation from the virtual presentations 158 to be displayed on the display 152 of the mobile device 150. For example, the controller 153 may select a virtual presentation based on the data acquired during one or more of operations 712-716. In one embodiment, the controller 153 selects a virtual presentation from a list of virtual presentations stored within the memory 157 based on the data acquired during one or more of the operations 712-716. In one or more embodiments, the virtual presentation corresponds to the type of a playset. For example, a type of the playset may be determined form the acquired data. Further, if the type of playset is determined to be a castle, the controller 153 selects a virtual presentation that corresponds to an interior of a castle (e.g., the virtual presentation 200 of FIG. 2B).

In one or more embodiments, the virtual presentation comprises virtual content including a virtual object that is generated based on the data acquired during operations 712-716. For example, with regard to FIGS. 2A and 2B, a virtual presentation of the object 130, virtual object 212, may include elements 212a-212c within the virtual presentation 200. Further, with reference to FIG. 6B, the virtual presentation 614 may include a virtualized object (e.g., a virtualized cake) as the objects 612 are identified by the mobile device 150 as being elements corresponding to a cake.

In one embodiment, a plurality of virtual presentations is stored within the memory 157. Further, the controller 153 selects a virtual presentation from the plurality of virtual presentations based on the acquired data. For example, the controller 153 may determine one or more features of the playset from the acquired data and compares the features to the plurality of virtual presentations to select a corresponding virtual presentation. The virtual presentations may each include a one or more attributes which may be compared against the determined features of the playset to determine a virtual presentation to select.

At operation 730, the virtual presentation is displayed on the display on the display 152 of the mobile device 150. For example, the virtual presentation selected during operation 720 is displayed on the display 152 of the mobile device 150.

At operation 740, the controller 153 updates the virtual presentation displayed on the display 152. Updating the displayed virtual presentation includes determining one or changes to an object (e.g., the objects 130, 131, 132, 430, and 432). For example, the mobile device 150 may detect the insertion, removal, and/or movement of an object relative to an interior (e.g., the interior 104, 404) of a playset (e.g., the playset 100, 400). In response to the detection of an insertion, removal and/or movement of an object relative to the interior the controller 153 updates the virtual presentation displayed on the display 152 of the mobile device 150. For example, the virtual presentation may be updated to include a virtual presentation of an object inserted into the interior, omit a virtual presentation of an object removed from the interior, and/or move a virtual object when a position of an object is changed within the interior. In various embodiments, operation 740 is optional. For example, in one or more embodiments, the operation 740 may be omitted from the method 700.

In one or more embodiments, the mobile device 150 uses the sensors 154 to detect change to an object within an interior of the playset. For example, the camera 156a may scan the interior of the playset at predefined intervals to detect insertion, removal and/or movement of an object within the interior. A predefined intervals may be once every M seconds or once every M milliseconds, where M is one or more.

The mobile device 150 updates the displayed virtual presentation on the display 152 in response to the insertion, removal, and/or movement of the object within the interior 104. Further, the mobile device 150 may detect the removal of, insertion of, or movement of one or more of the objects 430 and 432 of FIG. 5. For example, the mobile device 150 may update a virtual presentation to display an updated augmented view of the object 130 in response to the insertion of the object 430 into the interior 405 or the removal of the of the object 430. For example, the presentation of the object 430 may be updated to include or omit the object 430 in response to insertion of the object 430 into the interior 405 or the removal of the of the object 430, respectively.

In one embodiment, updating the displayed virtual presentation comprises displaying a movie or an image, among others. For example, the controller 153 may update a displayed virtual presentation to show a movie in response to movement of the object 130 within interior 104. For example, with reference to FIG. 2, in response to the detection of the object 130 leaving the interior 104, a video showing a corresponding virtual object is displayed on the display 152.

In one or more embodiments, updating a virtual presentation includes determining the position of a user relative to the mobile device 150. For example, the camera 156b may be utilized to acquire the position of a user relative to the mobile device 150. Acquiring the position of a user may include acquiring the position between a user's eyes relative to the mobile device 150 and display 152. In one embodiment, as a user moves in one or more of the X, Y, and Z direction relative to the mobile device 150, the virtual presentation is adjusted in a corresponding way. For example, if a user moves in the positive Z direction, the virtual presentation may be shifted in a negative Z direction. The virtual presentation may also be shifted in correlation to the angle determined to be moved by the user. In other embodiments, determining the position of a user relative to the mobile device 150 comprises determining the position of a user's pupils. Further, as the user's pupils are to be moved, the movement may be detected by the camera 156b and the virtual presentation may be adjusted accordingly.

Near-Field Communication Extending System

Playsets incorporate NFC devices to enhance the user experience of the playset. For example, the NFC devices wirelessly communicate with a mobile device 150 to communicate data to the mobile device 150 and generate an interaction within the mobile device. However, the user experience of a playset including NFC devices is limited due to the limited wirelessly communication range of the NFC devices. For example, a user may be required to move a mobile device within a playset to interact with objects at different positions within the playset. However, the communication range may be increased by coupling each of the NFC devices to another NFC device (e.g., an NFC extender) which wirelessly communicates with the mobile device. For example, NFC devices typically have a communication range of about 10 cm, but that range may be increased by incorporating additional NFC devices that are coupled together. Accordingly, the user experience is improved as the user may communicate with different parts of the playset without having to move the mobile device around the playset.

Figure 8:
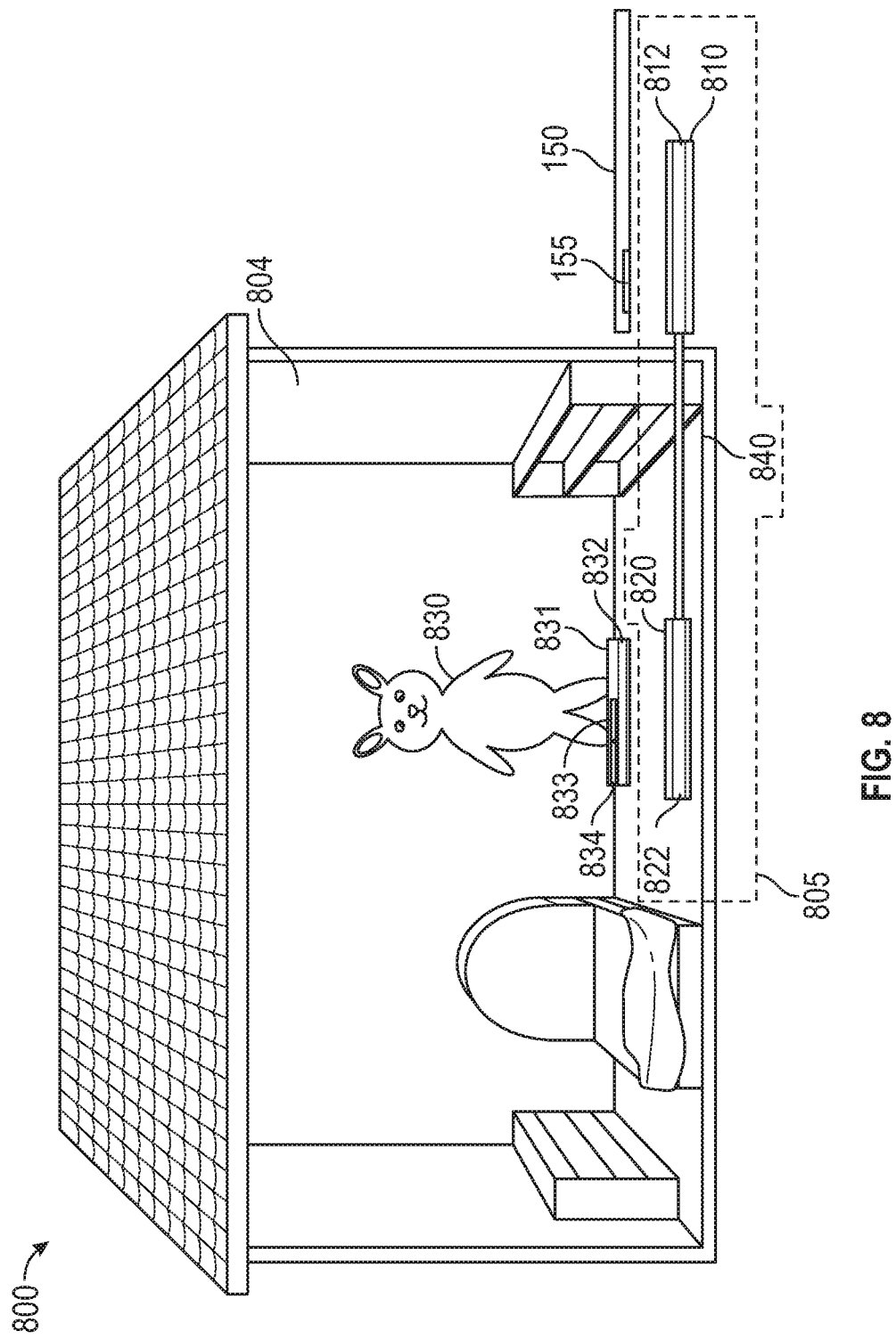
FIGS. 8, 9, and 10 are illustrations of playsets, according to one or more embodiments.
Figure 9:
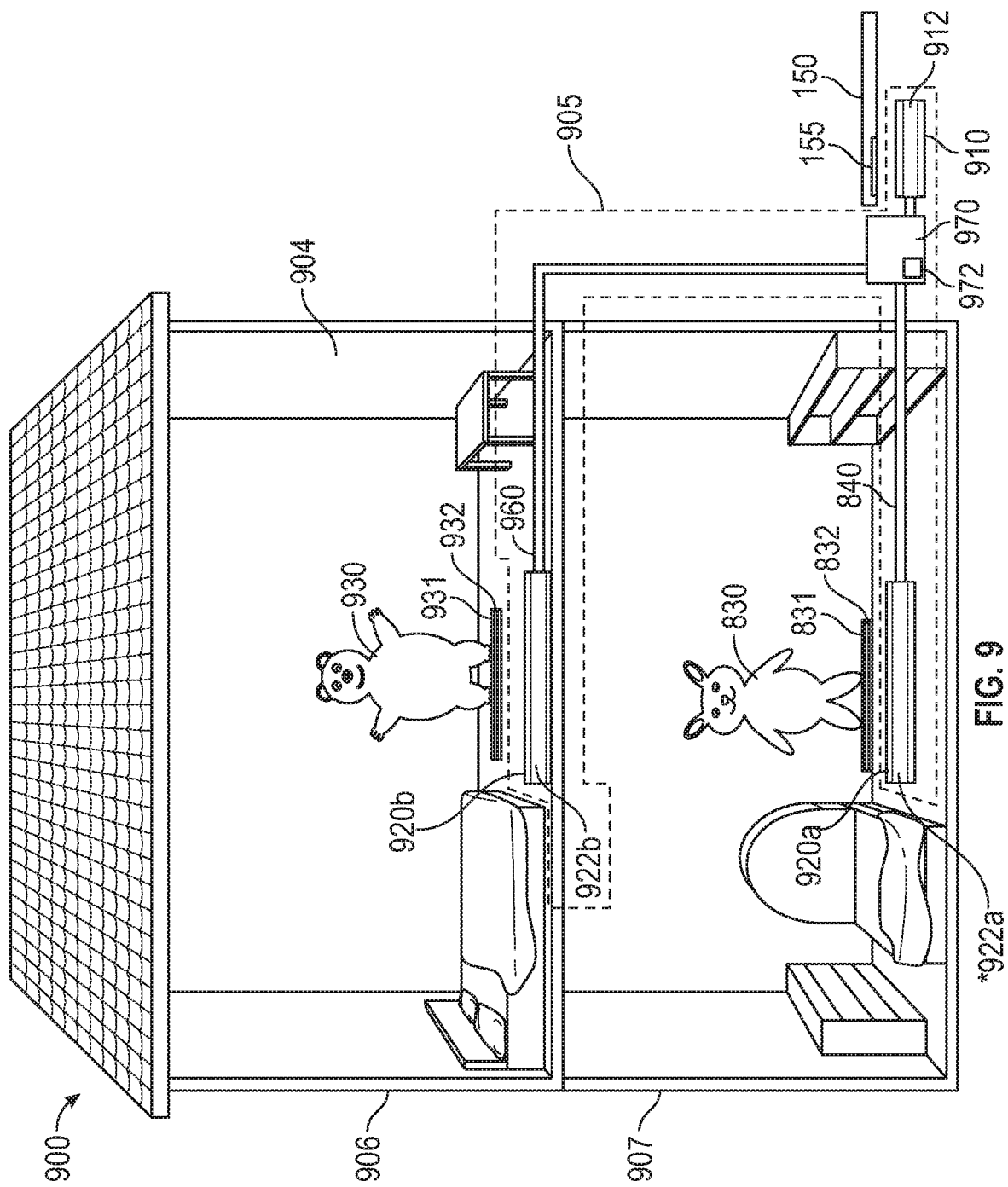

FIG. 8 illustrates a playset 800, according to one or more embodiments. For example, the playset 800 includes an NFC extending system 805. In one or more embodiments, the NFC extending system 805 comprises a main antenna 812 and an extending antenna 822. Further, the NFC extending system 805 includes connecting element 840 coupling the main antenna 812 with the extending antenna 822. In other implementations, the main antenna 812 is also part of an NFC device 810 and the extending antenna 822 is part of an NFC device 820. The connecting element 840 comprises one or more standard and/or impedance matched wires and/or cables. In various embodiments, as shown in FIG. 9, an NFC extending system (e.g., NFC extending system 905) may include two or more extending antennas (e.g., extending antennas 922a and 922b) coupled to a main antenna (e.g., the main antenna 912) via an antenna switching mechanism (e.g., antenna switching mechanism 970). Such an embodiment is described in greater detail with regard to FIG. 9.

The extending antenna 822 is positioned within the interior 804 of the playset 800. The main antenna 812 of the NFC extending system 805 is coupled to the extending antenna 822 via the connecting element 840. The NFC extending system 805 allows a mobile device (e.g. the mobile device 150) to communicate with an NFC device (e.g., the object 830) that is outside the range of the mobile device 150. Stated differently, the NFC extending system 805 allows a mobile device positioned external to the playset 800 to communicate with the object 830 via the antenna 832 of the NFC tag 831 located within the interior 804 of the playset 800 when the mobile device 150 would be otherwise be unable to communicate directly with the NFC device in the object 830. Further, in embodiments where the NFC extending system is comprised of multiple extending antennas 822, the NFC extending system allows a mobile device to communicate with multiple NFC devices located within the interior of a playset.

The main antenna 812 of the NFC extending system 805 is configured to couple with the NFC device 155 of the mobile device 150. Further, the antenna 822 of the NFC extending system 805 is configured to communicate with an antenna (e.g., the antenna 832) of an object (e.g., the object 830) within the interior 804.

The mobile device 150 may provide a power signal to the antenna 832 of the NFC tag 831 of the object 830 via the NFC extending system 805. In response to the receipt of the power signal, a processor 833 of the object 830 access a memory 834 of the object 830 and communicates data corresponding to the object 830 to the NFC device 155 of the mobile device 150 via the antenna 832 and the NFC extending system 805.

In various embodiments, the controller 153 of the mobile device 150 accesses the memory 157 of the mobile device 150 to generate a sound file to be played by the speaker 151 or to update an image or video displayed on the display 152 of the mobile device 150. For example, the controller 153 may access a sound file from the memory 157 that corresponds to the object 830 and plays the sound file via the speaker 151. The sound file may include music, speech, sounds, or the like. Further, the controller 153 may access a video file, image file, application object, or game object from the memory 157 that corresponds to the object 830 and updates the displays 152 accordingly. In one or more embodiments, the input device 160 may receive input data from a user that may be utilized by the controller 153 to alter a sound file playing by the mobile device 150, a video playing on the mobile device 150, and/or an image displayed by the mobile device 150.

FIG. 9 illustrates playset 900 with multiple extending antennas, according to one or more embodiments. The playset 900 includes an interior 904. Further, the playset 900 has rooms 906 and 907. The playset 900 includes the NFC extending system 905. The NFC extending system 905 is disposed within the interior 904 and in rooms 906 and 907. The NFC extending system 905 includes the extending antennas 922a and 922b and is configured to communicatively couple with an object (e.g., the object 830 or 930) via an antenna switching mechanism 970. Further, the NFC extending system 905 includes connecting elements 940a and 940b. The connecting elements 940a and 940b may each include one or more standard and or impedance matched wires and/or cables. Additionally, in other implementations, the extending antenna 922a is part of an NFC device 920a and the extending antenna 922b is part of an NFC device 920b.

The antenna switching mechanism 970 is coupled to the main antenna 812. The antenna switching mechanism 970 may be wirelessly powered by the NFC device 155 of the mobile device 150. Alternatively, the antenna switching mechanism 970 may be powered by a local power source (e.g., one or more batteries). In embodiments where the antenna switching mechanism 970 is wirelessly powered, the antenna switching mechanism 970 may be referred to as a wirelessly powered antenna switching mechanism. Further, in such embodiments, the antenna switching mechanism 970 wirelessly receives a power signal from the antenna of the NFC device 155 which powers the antenna switching mechanism 970.

The antenna switching mechanism 970 may be disposed external to the playset 900 or internal to the playset 900 in the interior 904. Further, each of the rooms 906 and 907 may have one or more NFC devices 920 and corresponding extending antennas 922. For example, each of the rooms may have two or more extending antennas 922.

The antenna switching mechanism 970 sequentially couples the main antenna 912 to each of the extending antennas (e.g., extending antennas 922a and 922b) of the NFC extending system 905. For example, in a first state, the antenna switching mechanism 970 couples the main antenna 912 to the extending antenna 922a and decouples the extending antenna 922b from main antenna 912. In a second state, the antenna switching mechanism 970 couples the main antenna 912 to the extending antenna 922b and decouples the extending antenna 922a from main antenna 912.

As illustrated in FIG. 9, in the first state, the antenna switching mechanism 970 couples the mobile device 150 to the object 830 via the extending antenna 922a of NFC extending system 905. In one embodiment, in the first state, the mobile device 150 transmits a power signal through the NFC extending system 905 to the antenna 932 of the object 830 to power and communicate with the NFC tag 831 of the object 830. Further, in the second state, the antenna switching mechanism 970 couples the mobile device 150 to the object 930. Additionally, in the second state, the mobile device 150 transmits a power signal through the NFC extending system 905 to the antenna 932 of the object 930 to power and communicate with the NFC tag 931 of the object 930.

The antenna switching mechanism 970 includes a control switching element 972. The control switching element 972 may be wirelessly powered by a mobile device (e.g., the mobile device 150) or powered by a local source (e.g., a battery). Further, the control switching element 972 may be powered the same way as the antenna switching mechanism 970. The control switching element 972 controls the state of the antenna switching mechanism 970. For example, the control switching element 972 controls whether the antenna switching mechanism 970 couples the main antenna 912 with the extending antenna 922a or 922b.

The control switching element 972 may be preprogrammed to periodically switch between the first and second states that connect extending antennas 922a and 922b respectively to the main antenna 912. Alternatively, the control switching element 972 may be controlled by the mobile device 150. For example, the mobile device 150 may transmit a power signal and control signal to the control switching element 972 to switch the antenna switching mechanism 970 between the first and second states. The timing of when the control switching element 972 changes the antenna switching mechanism 970 between states may correspond to a timing of when the power signal is provided by the mobile device 150. For example, each time the control switching element 972 receives the power signal, the control switching element 972 switches the state of the antenna switching mechanism 970. In embodiments where the antenna switching mechanism 970 can be coupled to two or more extending antennas and comprises two of more states, the control switching element 972 may switch the antenna switching mechanism 970 between each of the states of the antenna switching mechanism 970.

In one or more embodiments, the control switching element 972 may switch the antenna switching mechanism 970 between each of the states of the antenna switching mechanism 970 at a first rate. For example, in embodiments where the antenna switching mechanism 970 comprises two states, the control switching element 972 switches the antenna switching mechanism 970 from the first state to the second state and from the second state to the first state at a first rate. In one or more embodiments, the control switching element 972 may switch the antenna switching mechanism 970 between each of the states of the antenna switching mechanism 970 using different rates. For example, the antenna switching mechanism 970 may be positioned in the first state for a first period of time and in the second state for a second period of time, where the first period time is equal to, longer than or shorter than the second period of time.

Figure 10:
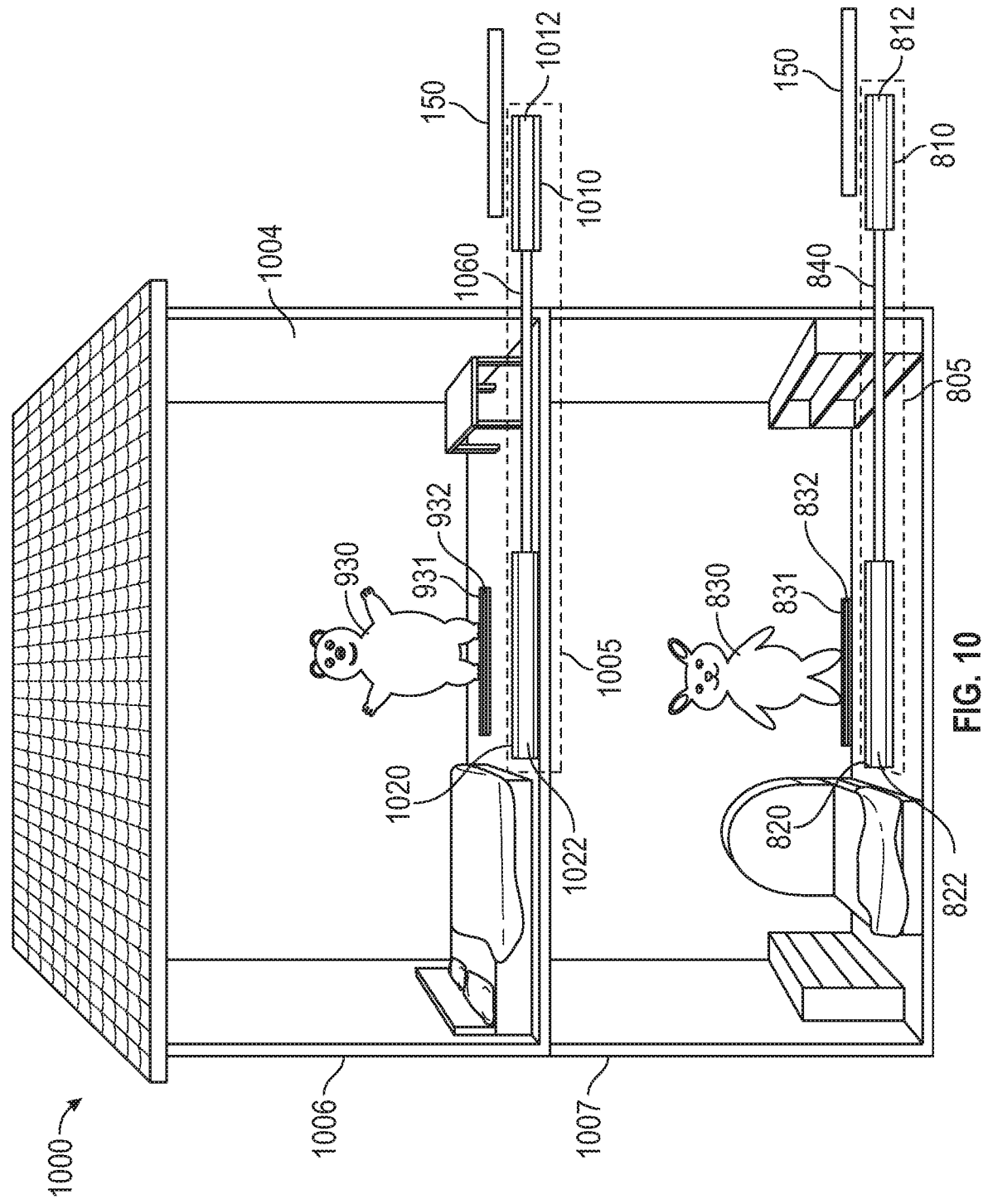

FIG. 10 illustrates a playset 1000, according to one or more embodiments. The playset 1000 is configured similar to that of the playsets 800 and 900. For example, the playset 1000 includes NFC extending systems 805 and 1005 that extend the NFC range of the mobile device 150. The NFC extending system 1005 is configured similar to that of the NFC extending system 805. For example, the NFC extending system 1005 includes extending antenna 1022, main antenna 1012 and connecting element 1060. The main antenna 1012 is coupled to the extending antenna 1022 via the connecting element 1060. Further, the main antenna 1012 is disposed within a NFC device 1010 positioned external to the playset 1000 while the extending antenna 1022 is disposed within a NFC device 1020 disposed within room 1006 in the interior 1004 of the playset 1000. Additionally, the connecting element 1060 is configured similar to that of the connection element 840.

As compared to the embodiment of FIG. 9, the embodiment of FIG. 10 may omit the antenna switching mechanism 970. For example, in the embodiment of FIG. 10, each of the extending antennas 822 and 1022 is coupled to a corresponding main antenna 812 and 1012, respectively. As another example, each of the extending antennas 822 and 1022, of the NFC devices 820 and 920, respectively, are coupled to a corresponding main antenna 812 and 1012 of the NFC devices 810 and 1010, respectively. In other embodiments, while each of the NFC extending systems 805 and 1005 are illustrated as comprising a single extending antenna (e.g., extending antennas 822 and 1022, respectively), one or more of the NFC extending systems 805 and 1005 comprise multiple extending antennas. In such embodiments, the NFC extending systems 805 and 1005 are configured similar to that of NFC extending system 905 and comprise an antenna switching mechanism coupled between the extending antennas and the corresponding main antenna.

The NFC extending systems 805 and 1005 wirelessly couple the mobile device 150 to the object 830, and the object 930, respectively. For example, the NFC device 155 of the mobile device 150 includes an antenna that couples to the main antenna 812. In embodiments employing RFID technologies, the NFC device 155 transmits a power signal that is received by the main antenna 812 and transmitted to the antenna 822 via the connecting element 840. The antenna 822 transmits the power signal to the antenna 832 of the object 830. In response to the receipt of the power signal, a processor of the object 830 transmits information corresponding to the object 830 to the NFC device 155 of the mobile device 150 through NFC extending system 805. Further, the NFC device 155 of the mobile device 150 includes an antenna that couples to the main antenna 1012 of the NFC extending system 1005. In embodiments employing RFID technologies, the NFC device 155 transmits a power signal that is received by the main antenna 1012 and transmitted to the extending antenna 1022 via the connecting element 1060. In response to the receipt of the power signal, a processor of the object 930 transmits information corresponding to the object 930 to the NFC device 155 through the NFC extending system 1005.

In one or more embodiments, a first mobile device couples to the NFC extending system 805 during a first period and a second mobile device couples to the NFC extending system 1005 during a second period. The first and second periods at least partially overlap. Alternatively, the first and second periods are non-overlapping. Further, in another embodiment, during a first period the mobile device 150 couples to the NFC extending system 805 and during a second period the mobile device 150 couples to the NFC extending system 1005.

Further, the NFC extending systems 805 and 1005 may be positioned within a common room. For example, while the extending antennas 822 and 1022 are illustrated as being positioned in different rooms (e.g., the rooms 1006 and 1007) of the playset 1000, the extending antennas 822 and 1022 may be disposed in a common room (e.g., either the room 1006 or 1007). Additionally, or alternatively, one or more of the NFC extending systems 805 and 1005 may include an extending antenna positioned in a first room (e.g., the room 1006) and an extending antenna positioned in a second room (e.g., the room 1007). In such embodiments, one or more of the NFC extending system 805 and 1005 may be configured similar to that of NFC extending system 905. Additionally, or alternatively, the playset 1000 may include more than two NFC extending systems positioned in one or more rooms within the interior 1004 of the playset 1000.

In various embodiments, the embodiments of FIGS. 8-10 may be combined with those of FIGS. 1 and 4. For example, NFC devices as described in the embodiments of FIGS. 8-10 may be utilized within the playset 100 or the playset 400. With regard to FIG. 1A, the opening 110 may be replaced with an NFC device such as NFC device 810, the NFC device 820 and the connection element 840 of FIG. 8.

Figure 11:
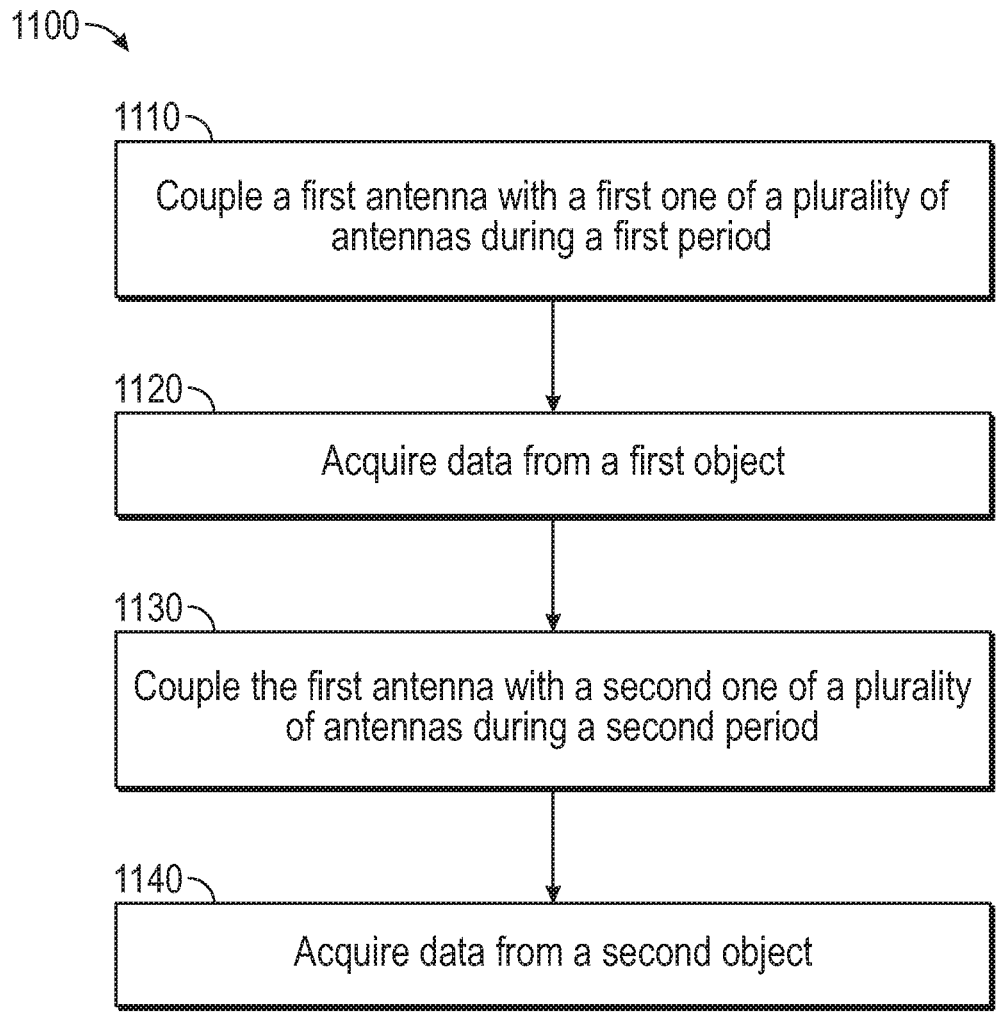
FIG. 11 is a flowchart for a method for interacting with a playset, according to one or more embodiments.

FIG. 11 is a flowchart of a method 1100 for interacting with a playset, according to one or more embodiments. At operation 1110, a first antenna (e.g., the main antenna 912 of the NFC extending system 905) is coupled to a first one of a plurality of antennas (e.g., the extending antenna of 922a or the extending antenna 922b of the NFC extending system 905) during a first period. In one embodiment, the antenna switching mechanism 970 couples the main antenna 912 of the NFC device 910 with the extending antenna 922a of the NFC extending system 905 during the first period. Alternatively, the antenna switching mechanism 970 couples the main antenna 912 of the NFC device 910 with the extending antenna 922b of the NFC extending system 905 during the first period. Further, during the operation 1110, the antenna switching mechanism 970 may receive a power signal wirelessly from the NFC device 155 of the mobile device 150 such that the switching mechanism is wirelessly powered and couples the main antenna 912 with one of the extending antennas 922a and 922b. Additionally, the control switching element 972 may be wirelessly powered and configured to switch the antenna switching mechanism 970 between the extending antennas 922a and 922b in response to receiving the power signal.

At operation 1120, the NFC device 155 of the mobile device 150 acquires data from a first object. For example, the NFC device 155 wirelessly acquires data from an object wirelessly coupled to the extending antenna 922a via the NFC extending system 905. Alternatively, the NFC device 155 is wirelessly coupled to the extending antenna 922b and acquires data from an object wirelessly coupled to the extending antenna 922b via the NFC extending system 905.

At operation 1130, the first antenna (e.g., the main antenna 912 of the NFC device 910) is coupled to a second one of a plurality of antennas (e.g., the other one of the extending antenna of 922a and the extending antenna 922b of the NFC extending system 905) during a second period. In one embodiment, if the extending antenna 922b was coupled to the main antenna 812 during the first period, the antenna switching mechanism 970 couples the main antenna 812 with the extending antenna 922a during the second period. Alternatively, if the extending antenna 922a was coupled to the main antenna 912 during the first period, the antenna switching mechanism 970 couples the main antenna 912 with the extending antenna 922b during the second period. The second period is non-overlapping with the first period. Further, during the operation 1130, the antenna switching mechanism 970 may receive a power signal wirelessly from the NFC device 155 of the mobile device 150 such that the switching mechanism is wirelessly powered and couples the main antenna 912 with one of the extending antennas 922a and 922b. Additionally, the control switching element 972 may be wirelessly powered and configured to switch the antenna switching mechanism 970 between the extending antennas 922a and 922b in response to receiving the power signal.

At operation 1140, the NFC device 155 of the mobile device 150 acquires data from a first object. For example, the NFC device 155 is wirelessly coupled to an object wirelessly coupled to the extending antenna 922a and acquires data from the object via the NFC extending system 905. Alternatively, the NFC device 155 is wirelessly coupled to an object wirelessly coupled to the extending antenna 922b and acquires data from the object via the NFC extending system 905.

The mobile device 150 may play a sound file via the speaker 151 based on the data acquired during one or more of the operations 1120 and 1140. In one embodiment, the mobile device 150 plays a first sound file via the speaker 151 based on data acquired during the operation 1120 and a second sound file via the speaker 151 based on data acquired during the operation 1140. For example, the controller 153 locates a sound file from the memory 157 based on the data acquired during the operation 1120 and/or 1140. Alternatively, or additionally, the mobile device 150 may display an image or movie in response to the data acquired during one or more of the operations 1120 and 1140. For example, the controller 153 locates a movie file from the memory 157 based on the data acquired during the operation 1120 and/or 1140 which is displayed on the display 152. A first image or movie may be displayed based on data acquired during the operation 1120. Further, a second image or movie may be displayed based on data acquired during the operation 1140.

Dual Near-Field Communication Tags

Figure 12:
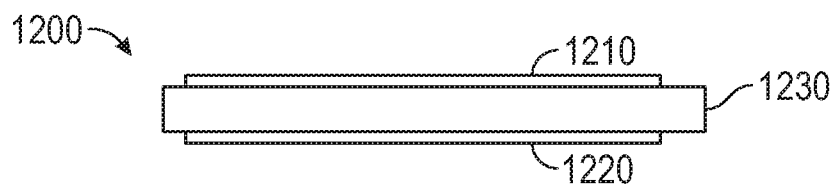
FIGS. 12, 13A, 13B, 14, 15, and 16 are illustrations of a NFC device, according to one or more embodiments.

FIG. 12 illustrates an NFC device 1200, according to one or more embodiments. The NFC device 1200 includes an NFC tag 1210, an NFC tag 1220 and a shield 1230. The shield 1230 shields the NFC tag 1210 from the NFC tag 1220. Further, the shield 1230 may be referred to as a shield layer. The NFC tag 1210 and the NFC tag 1220 may be passively or actively powered. For example, in one embodiment, the NFC tag 1210 and the NFC tag 1220 are passively powered receive power from an external device, e.g., the mobile device 150. In another embodiment, the NFC tag 1210 and the NFC tag 1220 are actively powered comprising a power supply. Further, the NFC tags 1210 and 1220 may be coupled to a common power supply.

Figure 13A:
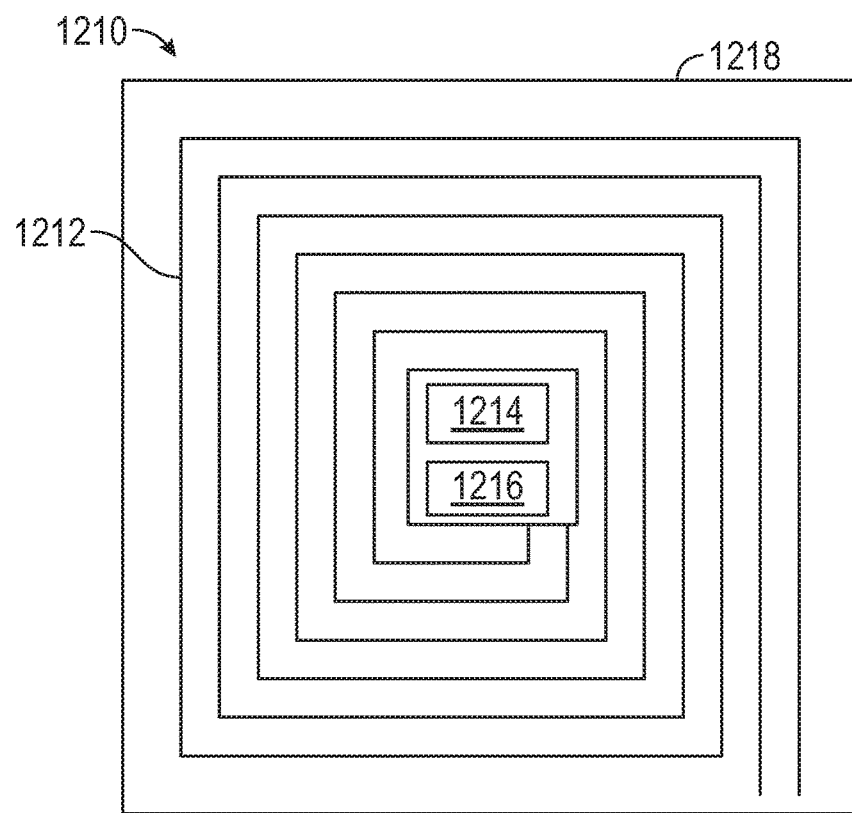

As illustrated in FIG. 13A, the NFC tag 1210 includes an antenna 1212, a processor 1214, memory 1216, and a substrate 1218. The antenna 1212, the processor 1214, and the memory 1216 are disposed on the substrate 1218. The processor 1214 is powered by a power signal provided by an external device, e.g., the mobile device 150 or a local power supply. The processor 1214 is communicatively coupled with the memory 1216. For example, the processor 1214 accesses information within the memory 1216 and communicates the information to an external device, e.g., the mobile device 150, via the antenna 1212. The memory 1216 stores information regarding a corresponding device. For example, the memory 1216 stores information regarding a corresponding object or objects.

Figure 13B:
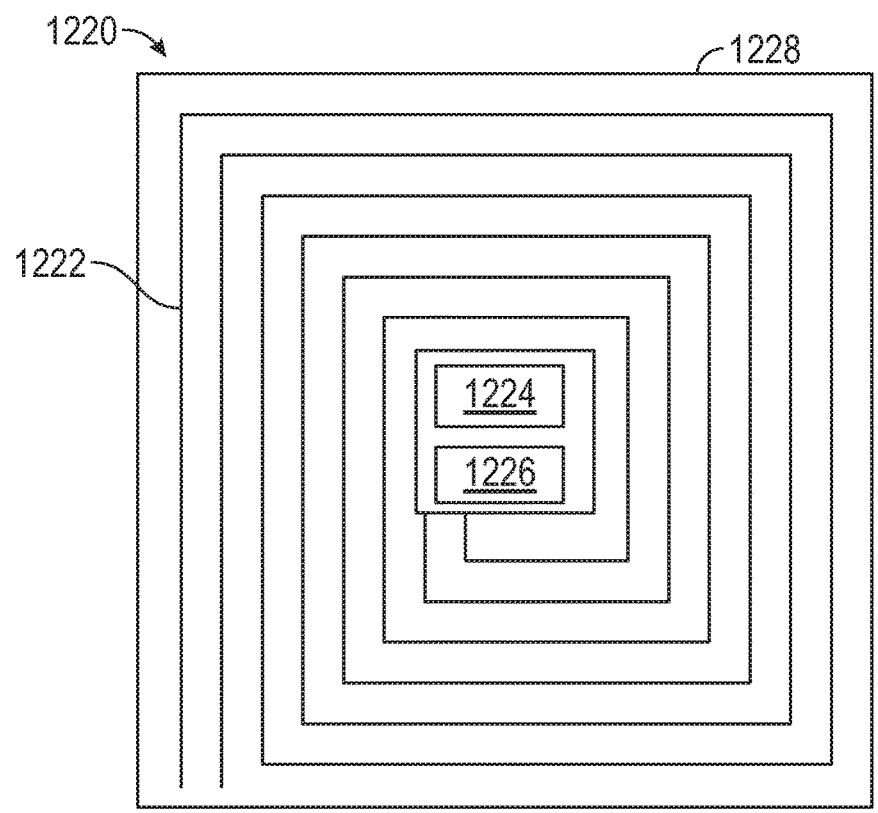

As illustrated in FIG. 13B, the NFC tag 1220 includes an antenna 1222, a processor 1224, memory 1226, and a substrate 1228. The antenna 1222, the processor 1224, and the memory 1226 are disposed on the substrate 1228. The processor 1224 is powered by a power signal provided by an external device, e.g., the mobile device 150 or a local power supply. The processor 1224 is communicatively coupled with the memory 1226. For example, the processor 1224 accesses information within the memory 1226 and communicates the information to an external device, e.g., the mobile device 150, via the antenna 1222. The memory 1226 stores information regarding a corresponding device. For example, the memory 1226 stores information regarding a corresponding object or object.

The shield 1230 may comprise a ferrite material. For example, the shield 1230 may comprise an iron oxide. The surface area of the shield 1230 may be larger than the outer boundary of each of the antennas of the NFC tags 1210 and 1220. For example, the antennas of the NFC tags 1210 and 1220 may be bounded on all sides by the shield 1230. In various embodiments, the shield 1230 may be attached to the NFC tags 1210 and 1220 via an adhesive. Alternatively, the shield 1230 may be attached to the NFC tags 1210 and 1220 through other methods. The shield 1230 isolates a magnetic field generated within the NFC tag 1210 from a magnetic field generated in NFC tag 1220. Accordingly, the shield 1230 prevents energy generated within the antenna 1212 of the NFC tag 1210 from interacting with energy generated within the antenna 1222 of the NFC tag 1220. Further, the shield 1230 prevents energy generated within the antenna 1222 of the NFC tag 1220 from interacting with energy generated within the antenna 1212 of the NFC tag 1210. For example, when a mobile device, e.g., the mobile device 150, is brought proximate the NFC tag 1210, energy is generated in the NFC tag 1210 and the shield 1230 prevents energy from being generated in the NFC tag 1220. Further, when a mobile device, e.g., the mobile device 150, is brought proximate the NFC tag 1220, energy is generated in the NFC tag 1220 and the shield 1230 prevents energy from being generated in the NFC tag 1210.

Figure 14:
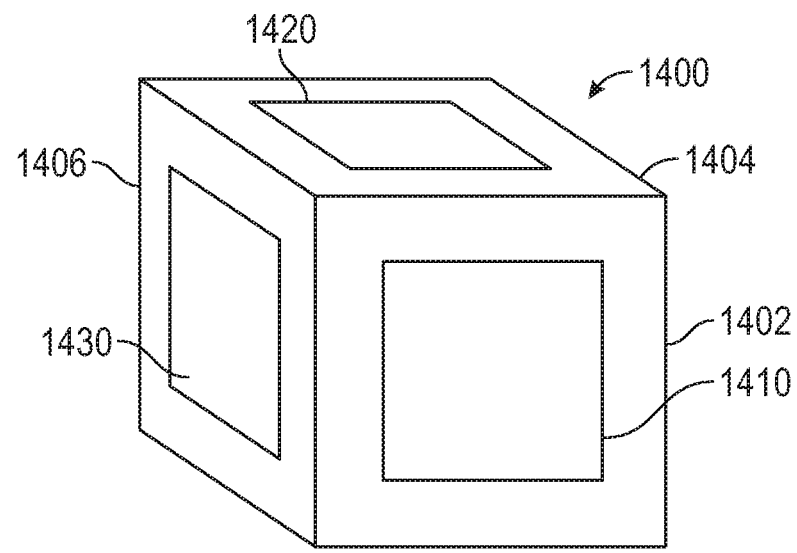

FIG. 14 illustrates an NFC device 1400. The NFC device 1400 includes sides 1402, 1404, and 1406. An NFC tag 1410 is disposed on side 1402, the NFC tag 1420 is disposed on side 1404, and the NFC tag 1430 is disposed on side 1406. Further, the NFC device 1400 may have additional sides not visible in FIG. 14. Additionally, an NFC tag may be disposed along each of the non-visible sides. In one or more embodiments, the NFC device 1400 includes three or more sides. Accordingly, the NFC device 1400 includes three or more NFC tags. Further, each of the NFC tags 1410, 1420, and 1430 may be configured similar to that of the NFC tags 1210 and 1220.

Figure 15:
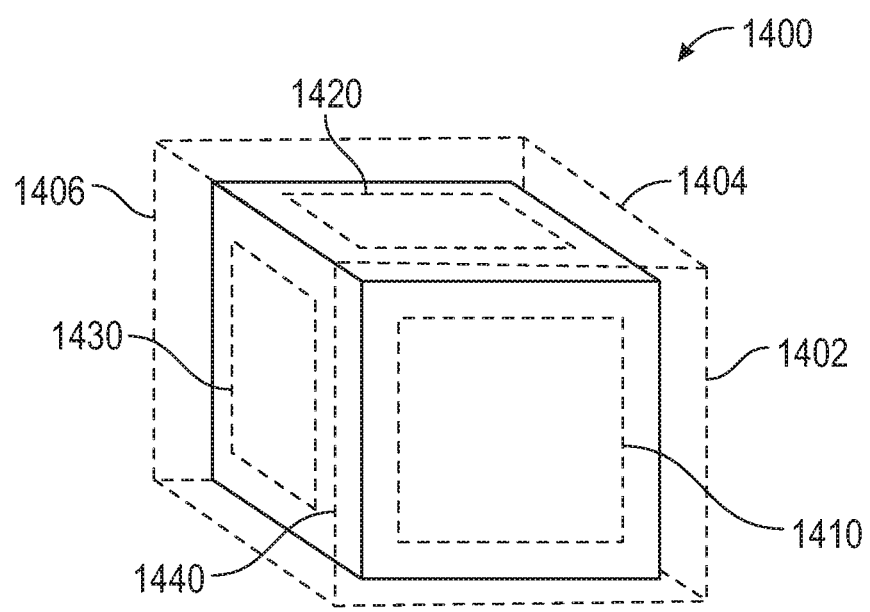

FIG. 15 illustrates the NFC device 1400 with the sides 1402, 1404, and 1406 made transparent such that the shield 1440 is visible. The shield 1440 may be configured similar to that of shield 1230 of FIG. 13B. For example, the shield 1440 isolates the NFC tags 1410, 1420, and 1430 from each other as described with regard to shield 1230 and NFC tags 1210 and 1220 of FIG. 12. The surface area of each side of the shield 1440 is larger than an outer boundary of the antenna of each corresponding NFC tag (e.g., the NFC tags 1410, 1420, and 1430). For example, the antenna of each NFC tag (e.g., the NFC tags 1410, 1420, and 1430) is bounded on all sides by a corresponding side of the shield 1440.

In one or more embodiments, a shield may be disposed along each side of the NFC device 1400. For example, a different shield may be attached to a side of the NFC device 1400 opposite each NFC tag.

Figure 16:
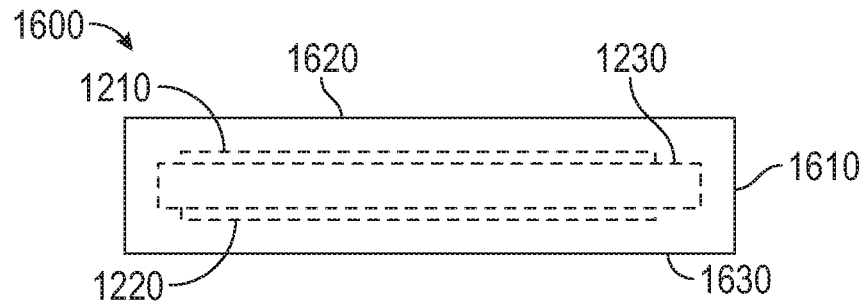

FIG. 16 illustrates an NFC device 1600. The NFC device 1600 includes the NFC tag 1210, the NFC tag 1220, and the shield 1230. The NFC device 1600 additionally includes housing 1610. The housing 1610 may include illustrations on one or more of the surfaces 1620 and 1630. The illustrations on the surfaces 1620 and 1630 may correspond to the NFC tag 1210 and the NFC tag 1220, respectively. For example, an illustration on the surface 1620 is different from an illustration on the surface 1630. Further, in addition to or alternatively to illustrations, the surface 1620 may have one of a first shape and feature and the surface 1630 may have one of a second shape and feature. The first shape and feature may differ from the second shape and feature.

Figure 17:
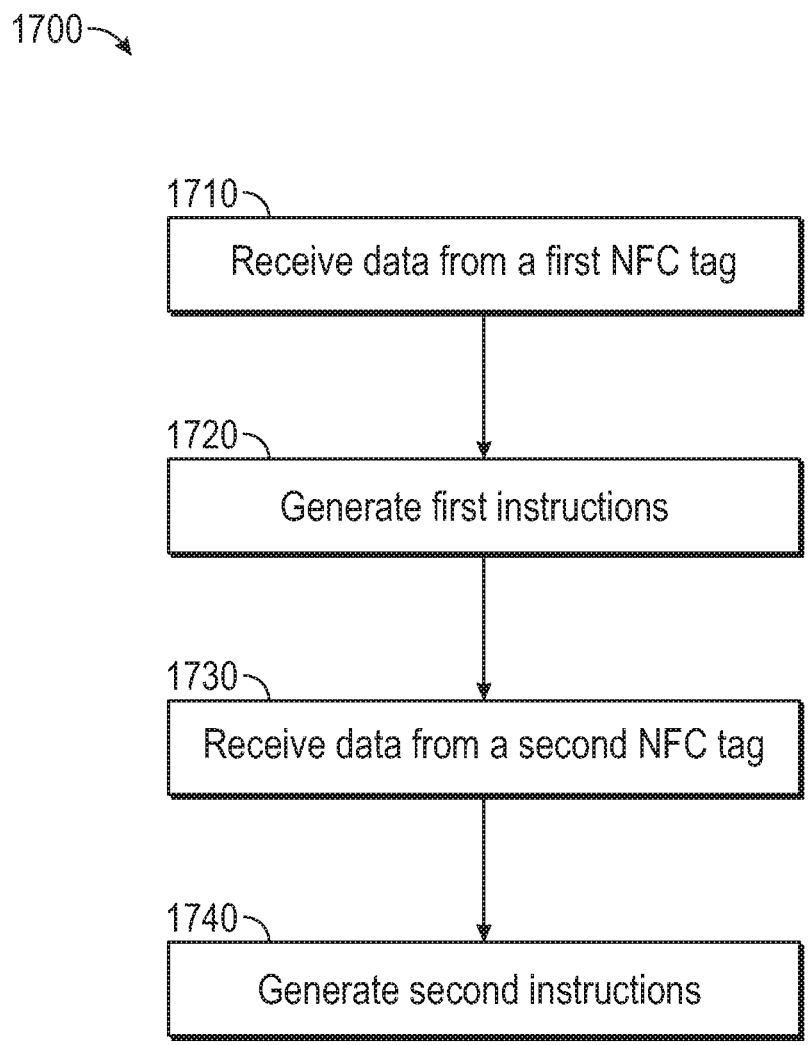
FIG. 17 is a flowchart for a method for interacting with a playset, according to one or more embodiments.

FIG. 17 illustrates a flowchart of method 1700 for interacting within an object, according to one or more embodiments. At operation 1710, the NFC tag 1210 is powered and data is received from the NFC tag 1210. For example, in one or more embodiments, when a mobile device, e.g., the mobile device 150, is positioned proximate the NFC tag 1210, a power signal provided by the NFC device 155 of the mobile device 150 is received by the antenna 1212 and communicated to the processor 1214. In response to receipt of the power (e.g., query) signal, the processor 1214 accesses the memory 1216 and transmits data corresponding to the NFC tag 1210 to the mobile device 150 via the antenna 1212. For example, the first action corresponds to a first state the NFC device 1600. Further, due to the shield 1230, the mobile device 150 is not able to communicate with the NFC tag 1220. In one specific embodiment, the NFC device 1600 corresponds to a piece of bacon and the first state corresponds to a raw, or uncooked, state. That is, one side of the NFC device can have a picture of raw bacon while the opposite side contains a picture of cooked bacon.

At operation 1720, the mobile device 150 generates first instructions based on the first data received from the NFC tag 1210. For example, the mobile device 150 generates first instructions corresponding to the first state of the NFC device 1600. In one embodiment, the first instructions initiate a function within an application executing on the mobile device 150. For example, the first instructions initiate a counter within the application running on the mobile device 150. The counter may be displayed to a user of the mobile device 150 via display 152. At the completion of the counter, the mobile device 150 may instruct a user to change the position of the NFC device 1600 such that the NFC tag 1220 is communicatively coupled to the NFC device of the mobile device 150.

At operation 1730, the NFC tag 1220 is powered and data is received from the NFC tag 1220. For example, in one or more embodiments, a power signal provided by the NFC device 155 of the mobile device 150 is received by the antenna 1222 and communicated to the processor 1224. In response to receipt of the query signal, the processor 1224 accesses the memory 1226 and transmits data corresponding to the NFC tag 1220 to the mobile device 150 via the antenna 1222. For example, the second action corresponds to a second state the NFC device 1600. In one embodiment, the second state corresponds to bacon in a cooked state.

At operation 1740, the mobile device 150 generates second instructions based on the second data received from the NFC tag 1220. For example, the mobile device 150 generates second instructions corresponding to the second state of the NFC device 1600. In one embodiment, the second instructions initiate a function within an application executing on the mobile device 150. For example, the second instructions initiate a displayed image or video output a sound indicating a corresponding action is complete. For example, a bell sound may be output via the speaker 151 indicating the bacon has been cooked.

In one or more embodiments, an NFC device having one or more NFC tags and a shield (e.g., the NFC device 1200 or 1600) may be utilized within a playset, such as playset 100 or 400. For example, one or more of the identification tag 431 of the object 430 and the object 432 of FIG. 4 may include two more NFC tags and a shield as illustrated in FIG. 12. In one embodiment, the identification tag 431 is configured similar to that of the NFC device 1200. In such an embodiment, the identification tag 431 includes two NFC tags separated by a shield. When utilized with the playset, during a first time period the object 430 may be positioned with a first orientation relative to the mobile device 150 such that a first NFC tag may be read by the NFC device 155. Further, a second time period the object 430 may be positioned with a second orientation relative to the mobile device 150 such that a second NFC tag may be read by the NFC device 155. The first and second NFC tags may correspond to a first and second state, respectively, of the object 430. Alternatively, the first and second NFC tags may correspond to a first object 430 and a second object, respectively.

In various embodiments, an NFC device comprising one or more NFC tags may be utilized with a playset configured similar to that of the playset 800 of FIG. 8, the playset of FIG. 9, and/or the playset of FIG. 10. For example, the NFC device 1200 may be utilized in the place of object 830 and/or 930 in the embodiments of FIGS. 8, 9 and/or 10. In one embodiment, with reference to FIG. 8, during a first period, the NFC tag 1210 couples with the NFC device 820 and during a second period the NFC tag 1220 couples with the NFC device 820. Further, with reference to FIG. 9, during a first period, the NFC tag 1210 couples with the NFC device 920 and during a second period the NFC tag 1220 couples with the NFC device 920. Additionally, with reference to FIG. 10, during a first period, the NFC tag 1210 couples with the NFC device 920 and during a second period the NFC tag 1220 couples with the NFC device 920.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for interacting with a playset, the method comprising:
   acquiring, using a first sensor on a mobile device, first data corresponding to the playset by reading a near field communication (NFC) tag disposed on the playset;
   acquiring second data corresponding to a first physical object disposed within the playset;
   selecting a virtual presentation from a plurality of virtual presentations to display on a display of the mobile device based on a comparison of a feature of the playset to attributes of the plurality of virtual presentations, wherein the feature of the playset is determined based on the first data and the second data, wherein the plurality of virtual presentations is stored within a memory of the mobile device;
   displaying, on the display, the virtual presentation while the mobile device is mounted with the playset, wherein the virtual presentation comprises virtual content corresponding to at least one of an interior of the playset and the first physical object;
   detecting, using a second sensor of the mobile device, a position of a user relative to the mobile device while the mobile device is mounted to the playset; and
   displaying, on the display of the mobile device, an updated virtual presentation based on the position of the user.

2. The method of claim 1, and wherein the virtual presentation comprises virtual content corresponding to the first physical object and the interior of the playset.

3. The method of claim 2, further comprising determining a type of the playset based on the first data, wherein selecting the virtual presentation to display further comprises selecting the virtual presentation based on the type of the playset.

4. The method of claim 3, wherein the virtual content corresponding to the first physical object corresponds to the type of the playset.

5. The method of claim 2, further comprising:
   detecting a change in position of the first physical object; and
   updating the virtual presentation based on the change in position of the first physical object.

6. The method of claim 1 further comprising acquiring third data corresponding a second physical object, and wherein the virtual presentation comprises virtual content corresponding to the first physical object and the second physical object.

7. The method of claim 1, wherein acquiring the first data corresponding to the playset comprises imaging, using the first sensor of the mobile device, the interior of the playset.

8. The method of claim 7, wherein imaging the interior of the playset comprises identifying a feature of at least one of the first physical object and the interior.

9. The method of claim 1, wherein acquiring the second data comprises reading an NFC tag disposed on the first physical object positioned within the interior of the playset.

10. The method of claim 1, wherein the first data is acquired by imaging the interior of the playset using the first sensor on the mobile device via an opening within a structure of the playset, the structure including walls and a roof that define the interior of the playset, wherein the mobile device is mounted to the structure, and wherein the NFC tag is disposed in the interior of the playset and on one of the walls.

11. A computer program product for interacting with a playset, the computer program product comprising:
    a non-transitory computer-readable storage medium having computer-readable program code embodied therewith, the computer-readable program code executable by one or more processors to:
    acquire, using a first sensor on a mobile device, first data corresponding to the playset by reading a near field communication (NFC) tag disposed on the playset;
    acquire second data corresponding to a first physical object disposed within the playset;
    select a virtual presentation from a plurality of virtual presentations to display on a display of the mobile device based on a comparison of a feature of the playset to attributes of the plurality of virtual presentations, wherein the feature is determined based on the first data and the second data, wherein the plurality of virtual presentations is stored within a memory of the mobile device;
    display, on the display, the virtual presentation while the mobile device is mounted with the playset, wherein the virtual presentation comprises virtual content corresponding to at least one of an interior of the playset and the first physical object;
    detect, using a second sensor of the mobile device, a position of a user relative to the mobile device; and
    display, on the display of the mobile device, an updated virtual presentation based on the position of the user.

12. The computer program product of claim 11, wherein the virtual presentation comprises virtual content corresponding to the first physical object and the interior of the playset.

13. The computer program product of claim 12, wherein the computer-readable program code is further executable by one or more processors to determine a type of the playset based on the first data, wherein selecting the virtual presentation to display further comprises selecting the virtual presentation based on the type of the playset.

14. The computer program product of claim 11, wherein the computer-readable program code is further executable by one or more processors to acquire third data corresponding to a second physical object, and wherein the virtual presentation comprises virtual content corresponding to the first physical object and the second physical object.

15. The computer program product of claim 11, wherein the first data is acquired by imaging the interior of the playset using the first sensor via an opening within a structure of the playset, the structure including walls and a roof that define the interior of the playset, wherein the mobile device is mounted to the structure, and wherein the NFC tag is disposed in the interior of the playset and on one of the walls.

16. A mobile device, comprising:
    a first sensor;
    a second sensor;

a memory comprising a plurality of virtual presentations;
a controller configured to:
  acquire, using the first sensor, first data corresponding to a playset by reading a near field communication (NFC) tag disposed on the playset;
  acquire second data corresponding to a first physical object disposed within the playset;
  select a virtual presentation from the plurality of virtual presentations based on a comparison of a feature of the playset to attributes of the plurality of virtual presentations, wherein the feature is determined based on the first data and the second data, wherein the plurality of virtual presentations is stored within the memory; and
  detect, using the second sensor, a position of a user relative to the mobile device; and
a display configured to display the virtual presentation while the mobile device is mounted with the playset, wherein the virtual presentation comprises virtual content corresponding to at least one of an interior of the playset and the first physical object, and wherein the virtual presentation is based on the position of the user relative to the mobile device.

17. The mobile device of claim 16, wherein the virtual presentation comprises virtual content corresponding to the first physical object and the interior of the playset.

18. The mobile device of claim 17, wherein the controller is further configured to determine a type of the playset based on the first data, wherein selecting the virtual presentation to display further comprises selecting the virtual presentation based on the type of the playset.

19. The mobile device of claim 16, wherein the controller is further configured to acquire third data corresponding to a second physical object, and wherein the virtual presentation comprises virtual content corresponding to the first physical object and the second physical object.

20. The mobile device of claim 16, wherein the first data is acquired by imaging the interior of the playset using the first sensor on the mobile device via an opening within a structure of the playset, the structure including walls and a roof that define the interior of the playset, and wherein the NFC tag is disposed in the interior of the playset and on one of the walls.

* * * * *

UNITED STATES PATENT AND TRADEMARK OFFICE
CERTIFICATE OF CORRECTION

PATENT NO. : 11,918,928 B2
APPLICATION NO. : 16/717479
DATED : March 5, 2024
INVENTOR(S) : Nathan D. Nocon et al.

It is certified that error appears in the above-identified patent and that said Letters Patent is hereby corrected as shown below:

In the Specification

In Column 11, Lines 48-49, delete "on the display on the display" and insert -- on the display --.

In Column 12, Lines 20-21, delete "of the of the" and insert -- of the --.

In Column 12, Line 24, delete "of the of the" and insert -- of the --.

In the Claims

In Column 23, Line 42, in Claim 2, delete "claim 1, and wherein the virtual" and insert -- claim 1, wherein the virtual --.

Signed and Sealed this
Twenty-fourth Day of September, 2024

Katherine Kelly Vidal
*Director of the United States Patent and Trademark Office*